United States Patent [19]

Kelly

[11] Patent Number: 5,185,738
[45] Date of Patent: Feb. 9, 1993

[54] FIBEROPTIC TELEPHONE SYSTEMS

[75] Inventor: Leroy Kelly, Allen, Tex.

[73] Assignee: People's Telephone Cooperative, Inc., Quitman, Tex.

[21] Appl. No.: 618,590

[22] Filed: Nov. 28, 1990

Related U.S. Application Data

[62] Division of Ser. No. 358,634, May 30, 1989, abandoned, which is a division of Ser. No. 117,062, Nov. 5, 1987, Pat. No. 4,860,287.

[51] Int. Cl.$^5$ ............................................... H04J 3/16
[52] U.S. Cl. ..................................... 370/95.1; 379/269; 379/290
[58] Field of Search ................ 370/95.1, 95.2, 85.7, 370/56; 379/231, 244, 269, 290

[56] References Cited

U.S. PATENT DOCUMENTS

| | | | |
|---|---|---|---|
| 3,779,628 | 12/1973 | Kapron et al. | 350/96.15 |
| 4,689,619 | 8/1987 | O'Brien, Jr. | 370/95.2 |
| 4,763,976 | 8/1988 | Nolan et al. | 350/96.15 |
| 4,804,248 | 2/1989 | Bhagavatala | 350/96.15 |
| 4,839,892 | 6/1989 | Sasaki | 370/95.1 |
| 4,860,287 | 8/1989 | Kelly | 370/108 |
| 4,998,249 | 3/1991 | Bennett et al. | 370/95.1 |

Primary Examiner—Douglas W. Olms
Assistant Examiner—Min Jing
Attorney, Agent, or Firm—Cushman, Darby & Cushman

[57] ABSTRACT

A telephone network with distributed processing capabilities. A local controller is provided for monitoring status of a plurality of users. A primary controller performs circular polls of the local controllers to determine status changes. The system operates in a time division multiplexed fashion, and the primary controller assigns during which time slot each particular conversation will occur. A synchronizer for synchronizing between the primary and the secondary controller is also provided. In addition, the ring timing for the subscriber premise can be performed in the microprocessor at the subscriber premise.

18 Claims, 18 Drawing Sheets

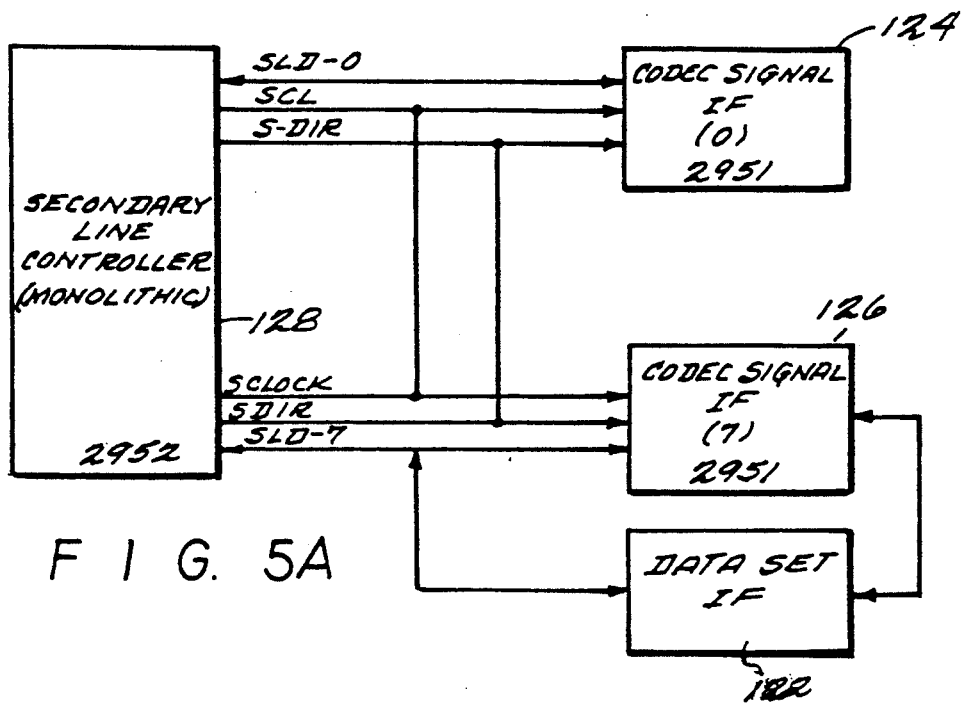
F I G. 5A
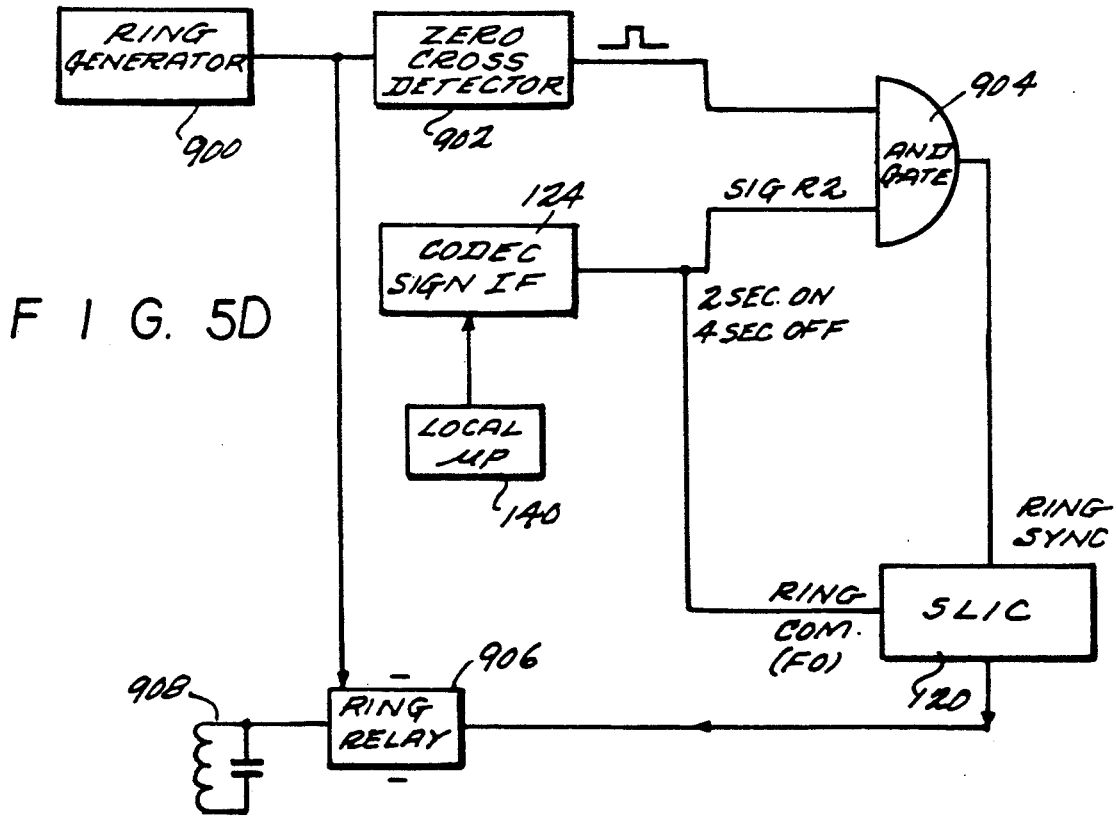
F I G. 5D

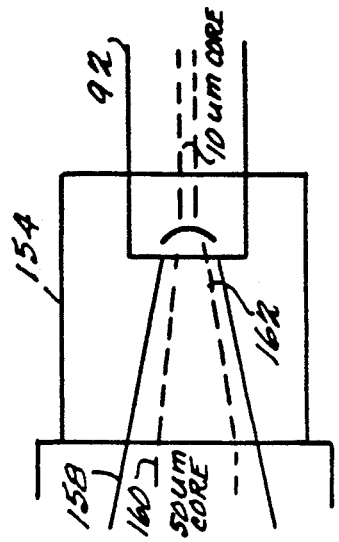
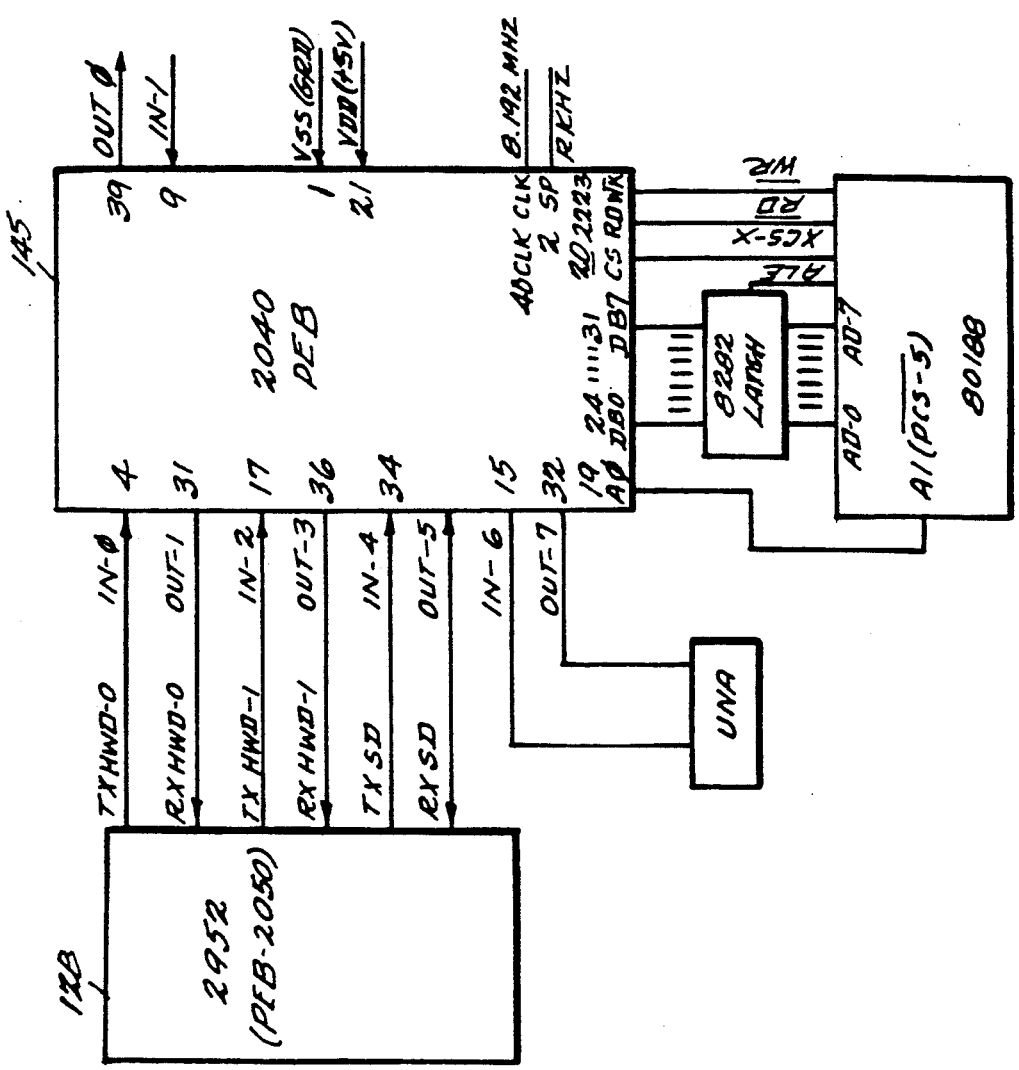
FIG. 7
FIG 5C

FIBEROPTIC TELEPHONE SYSTEMS

This is a division of application Ser. No. 358,634, filed on May 30, 1989, which was abandoned upon the filing hereof, which was a divisional application of Ser. No. 117,062, filed Nov. 5, 1987, which is now U.S. Pat. No. 4,860,287, issued Aug. 22, 1989.

BACKGROUND AND SUMMARY OF THE INVENTION

The present invention relates to a voice, data, and telephone network intended to operate over a cable. More specifically, a preferred embodiment of the invention comprises a fiber optic telephone and cable TV system with data capabilities.

Telephone systems have become an integral part of communications in the world today. However, most telephone systems use the same architecture which was used by telephone systems when they were originally conceived in the early 1900's.

Specifically, when telephone systems were first being put into normal use, these telephone systems consisted of nothing more than a plurality of wires each run to a house in the telephone system, and a switchboard operator who manually patched one wire into another. To make a long distance call, the switchboard operator would contact another switchboard operator, and the calls would be manually patched together. As time went on, and with the advent of mechanization, the switchboard operator was replaced with an automated switching system. However, this automated switching system performed the exact function of the operator—patching one telephone to another to complete the call. Because of this evolution of telephone systems, today's typical telephone system will have relatively dumb or unintelligent telephones, with most of the intelligence concentrated at the central office switching area. Thus, while various intelligent functions have been built into the central office system, the typical telephone is still a relatively unsophisticated piece of machinery. In addition, the typical telephone system has a dedicated pair of wires running from the central office to the telephone itself.

This leads to numerous problems. Most serious among these problems is the necessity to run a dedicated wire pair or more for each telephone in use. As the number of subscribers in an area increases, the number of lines also increases, and it may become necessary to run additional lines into the area. In addition, it becomes necessary to keep careful track of each of a plurality of lines, as each line in the bundle must go to a special location.

Many intelligent telephone systems are on the market today, known generally as PABXs, or private automatic branch exchanges. These PABXs will provide intelligence to the local telephone system, so that each telephone can perform a plurality of functions. However, these PABXs are in turn coupled to the existing telephone system, and thus have all the same drawbacks that were discussed above. Specifically, it is necessary to run a dedicated line for each telephone number. Also, all switching functions occur at the central office, and, even though the PABX has a lot of intelligence built therein, this intelligence can only be used to simulate the unsophisticated telephone that the central office expects.

A need clearly exists for a telephone system with distributed intelligence, and one especially useful with the advent of wide-band cable, such as optical fibers.

Accordingly, the present invention is such a system in which a controller is located at the central office, and a controller is located at each subscriber premise. The controller at each subscriber premise performs various preprocessing functions and sends messages to the controller at the central office. The controller at the central office, in turn, determines the operations which should occur between various structures, and commands the various controllers at premise locations to perform these functions. In a preferred embodiment of this invention, the telephone information for a plurality of subscriber premises is sent over a single optical fiber. This fiber is split off at various locations so that this fiber can go to a plurality of locations. Another aspect of this invention involves coupling cable TV (CATV) information onto this same fiber optical distribution network.

The prior art, for various reasons, has never performed this function. Many problems would exist as an impediment to one of ordinary skill in the art, and these problems have been overcome according to the present invention. These problems include structure necessary to provide a relatively inexpensive but highly functional system, including a structure and method which uses inexpensive lasers or LEDS, in order to perform the function usually performed by an expensive laser. Another problem which is overcome by the present invention is that of synchronization between the remote and local ends.

BRIEF DESCRIPTION OF THE DRAWINGS

An exemplary and presently preferred embodiment of the invention will be described in detail with reference to the accompanying drawings, wherein:

FIG. 5A shows a detailed layout between structures in the premise equipment;

FIG. 5C shows the demultiplexer used according to the present invention;

FIG. 5D shows a ring synchronization circuit;

FIG. 7 shows a detailed drawing of the multimode to single mode converter used according to the present invention;

FIG. 8 shows the voice data trunking and local distribution system used according to the present invention;

FIG. 14 shows a synchronizer for use at the subscriber location;

DETAILED DESCRIPTION OF THE PREFERRED EMBODIMENT

Figure 1:
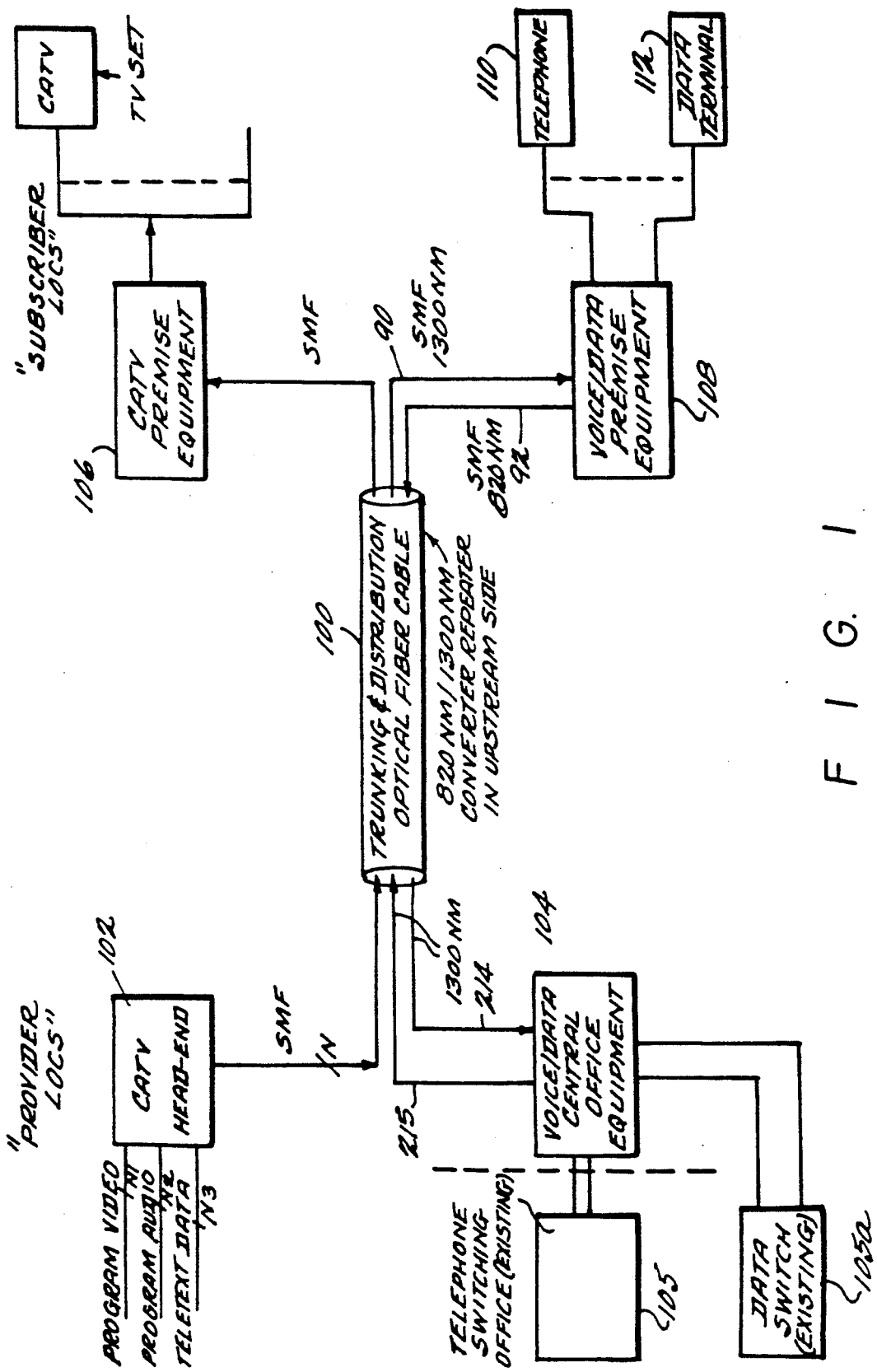
FIG. 1 is a block diagram of the system of the present invention.

FIG. 1 is a block diagram of the system according to the present invention. A plurality of information is carried over fiber cable 100, both to and from premise equipment 108 at subscriber locations, and central equipment 104 at provider locations. The CATV portion of the system includes a CATV head end 102. The CATV head end 102 includes inputs of program video, program audio and teletext data, and receives a plurality of each kind of input. The program video and audio are typically used to provide the programming material which is watched by the user at the subscriber location. The teletext data is used for a teletext encoder, which edits information onto the screen watched by the user at the subscriber location. The output of the CATV head end is a plurality of single mode fibers (SMF) which are input to the trunking and fiber cable 100.

The voice/data central office equipment or terminal 104 is also located at the provider location. Voice data central office equipment or terminal 104 connects directly to the existing switching office 105 and existing data switch 105a, and is completely compatible with both. Voice/data central office equipment or terminal 104 includes an input line 214 and an output line 215, both coming from trunking and distribution optical fiber cable 100.

Premise equipment 106 for the cable TV system (CATV) and premise equipment 108 for the voice/data system are both located at the subscriber locations. A plurality of telephone sets 110/data terminals 112 are attached to the voice/data premise equipment 108. Representative structures of telephone 110 and data terminals 112 are shown.

The operation and specific structure of the embodiment of FIG. 1 will be described in detail herein and throughout this specification.

Figure 2:
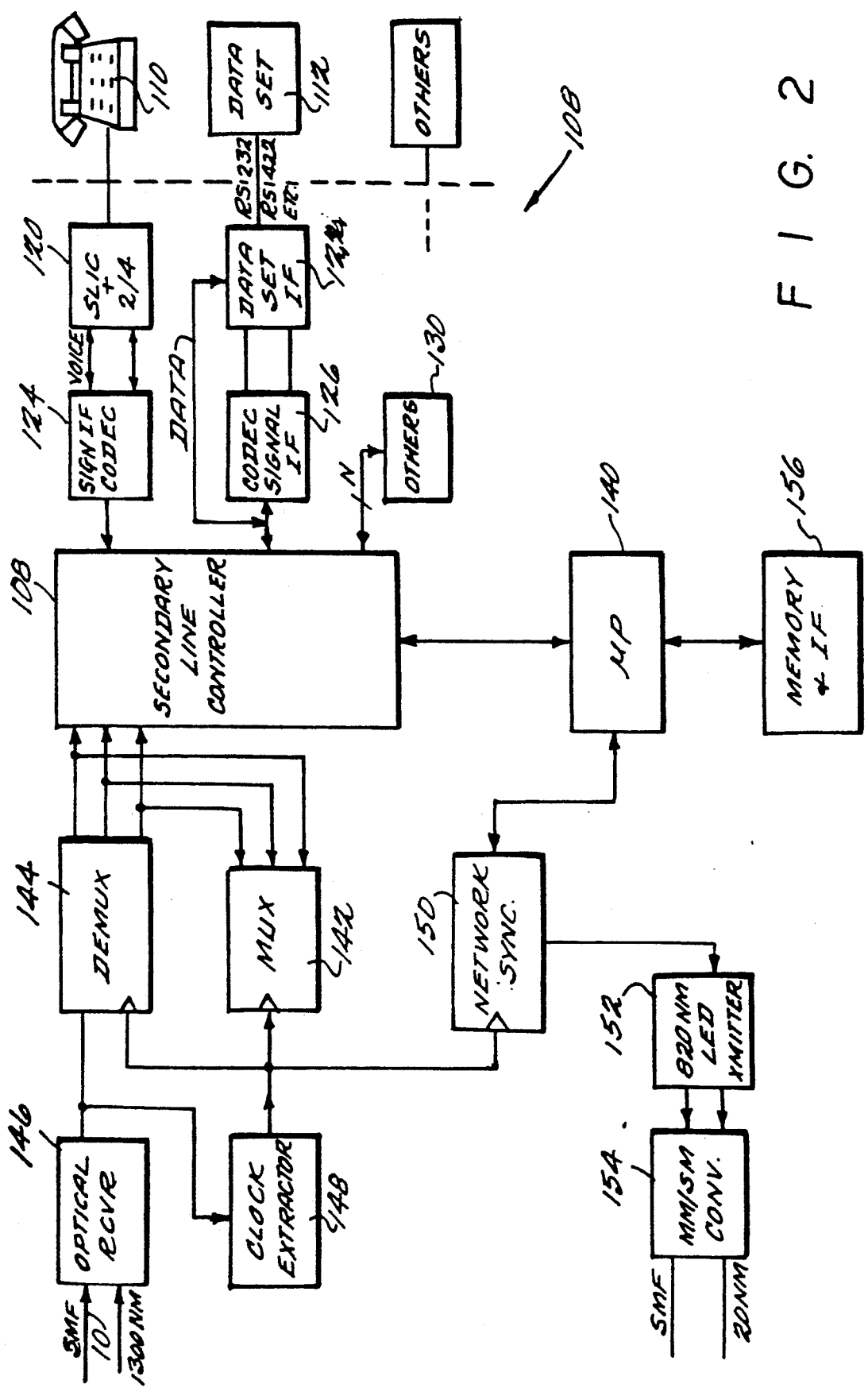
FIG. 2 is a diagram of the subscriber premise equipment for the telephone system.

FIG. 2 shows the specific structure of the voice/data premise equipment 108 as connected to telephone 110 and data terminal 112. The subscriber equipment, e.g. telephone 110 and data set 112 are each attached to an associated subscriber line interface circuit (SLIC) 120 and 122, respectively. The subscriber line interface 120 is a line interface for a telephone which includes a two-wire to four-wire converter, and also performs the following functions:

1. Line battery feed (talk and signal battery adequate to provide a minimum of 20 milliamperes of off-hook line current). i.e., 300 Ohm line feed, 200 Ohm telephone set, and 400 Ohm line loop resistance equals 30 milliamperes of loop current with −24 volt battery.

2. Line current regulation: the −24 volt line battery and the +12 volt inputs are connected in series internally and automatically regulated to provide 46 milliamperes or less of line current. This function reduces battery drain on short loops and increases the voltage to compensate for up to 1000 Ohms loop resistance (0–20,000 feet on 24 AWG twisted pair).

3. Ringing relay control: synchronous and non-synchronous: A +5 V pulse of 50–500 microsecond duration on the ring synchronization input pin on the negative going zero crossing of the ring generator signal assures that ring relay will be turned on only at or near the "0" voltage level (synchronous ringing). In the absence of a ring synchronization input, the ring relay is controlled by the input on the ring command pin (asynchronous ringing). Another use of the ring synch input is to provide ringing current synchronized with the ringing tone provided at the central office, or with external logic, synchronous with the zero crossing of the ringing generator and the central office.

4. Message waiting lamp control: A positive 5 volt pulse on the message control lead (F1) of SLIC 120 causes an active low output on the MWR pin. This low output is used for driving an external relay to provide a high voltage feed for lighting a message waiting lamp (same as ring command and RR pin functions). This function would be typically used in hospital or hotel/motel applications.

5. Two wire to four wire conversion.

6. Transhybrid balance facilitation using internal operational amplifiers to reduce far end crosstalk - echo effect (ERL=echo return loss).

7. Longitudinal balance: balances the noise on both sides of the line so that they are effectively cancelled.

8. Ground key detection: Special phones, such as firemen line circuits, require a ground key button that inserts a ground on the ring side of the subscriber's line that creates a current imbalance. This condition is detectable by SLIC 120. It is sometimes also used to alert a PBX operator at a motel or the like to allow a Customer to have the operator bridge onto the line without the customer having to hang up.

9. Off-hook detection: SLIC 120 monitors the line current and activates the SW HK DET output pin if the current exceeds approximately 12 milliamperes. This effectively detects the "off-hook" condition of the telephone.

10. Power down control: This allows the system to disable SW HK DET by limiting the loop current to approximately 2 ma. This would be done to conserve power during an emergency condition or selective denial of call origination and/or termination.

Thus, among other things, this subscriber line interface converts the twisted pair input from the telephone to separate voice and signal outputs, detects off-hook, and provides line balance functions. The subscriber line interface 122 is a data set interface for converting information from data set 112 into four-wire data and signal information (CTS, RTS, TXD, RXD).

Subscriber line interface 120 is connected to Codec assembly 124. This Codec assembly includes an A-D converter as well as a D-A converter. The A-D converter accepts an analog input and samples the instantaneous voltage level 8000 times per second. Each sample is translated into an eight bit representation of the value using non-linear steps according to the European (a) law or the U.S. (mu) law algorithm. The analog input should be prefiltered to limit the bandwidth to between 200 to 3400 hertz. The digital-to-analog or D-A converter accepts an eight bit word and converts it to an instantaneous value based on one of the above-discussed algorithms (a or mu). These outputs are then smoothed and fed serially to the output. The codec/signal interface is only used to facilitate RTS, CTS, DSR, DTR, etc. for data set interface functions; the actual data (in eight bit words) by-pass the codec/signal interface and are gated and clocked onto the "SLD-X" lead after the start, stop, and parity bits have been stripped off by the data set interface.

Similarly, the data set interface 122 is connected to Codec 126. Codecs 124 and 126 are both connected to secondary line controller 128. Other Codecs, represented by element 130, may also be connected to secondary line controller 128.

Figure 3:
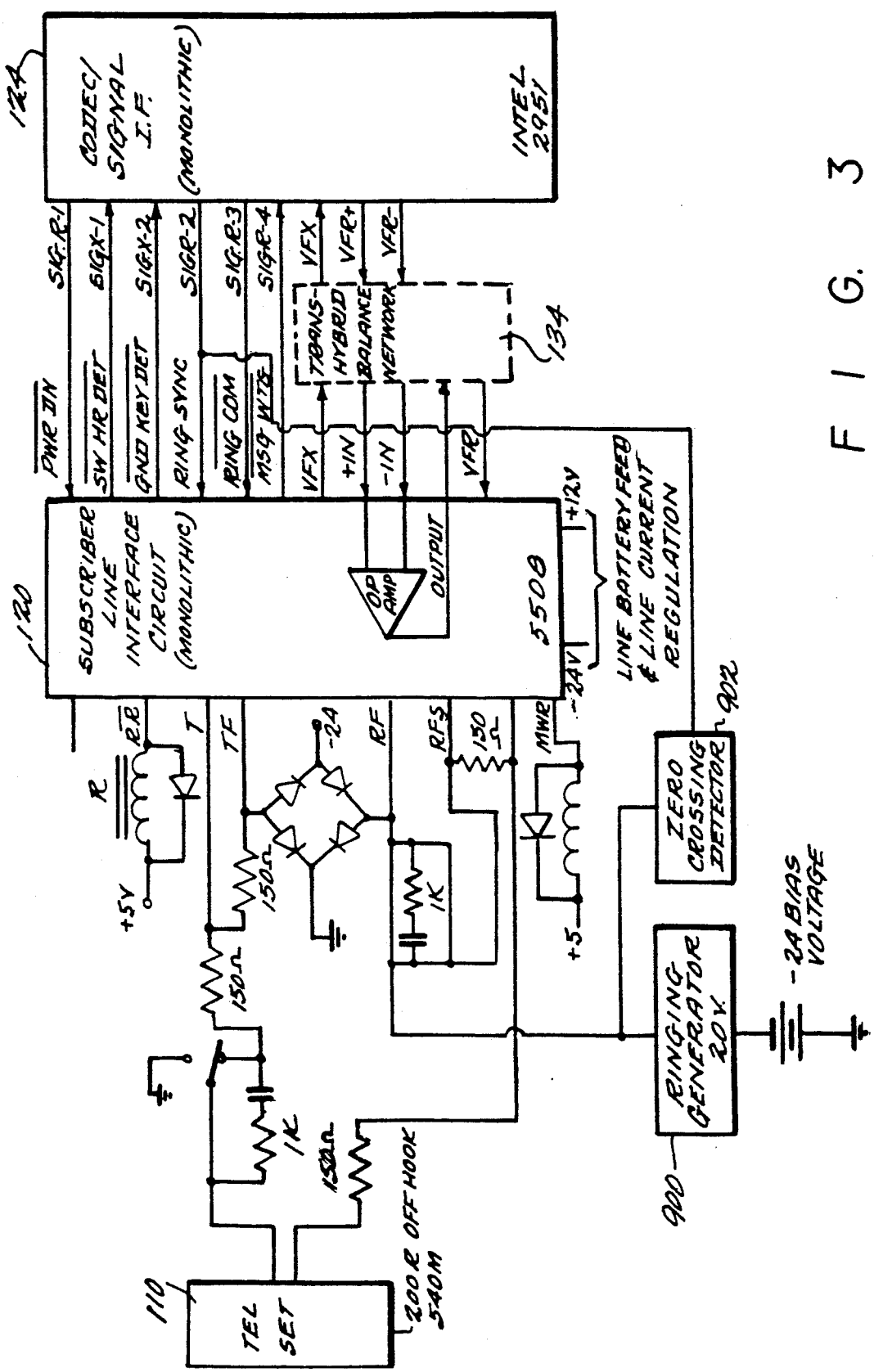
FIG. 3 shows the detailed configuration of the interconnection between the premise equipment shown in FIG. 2.
Figure 4:
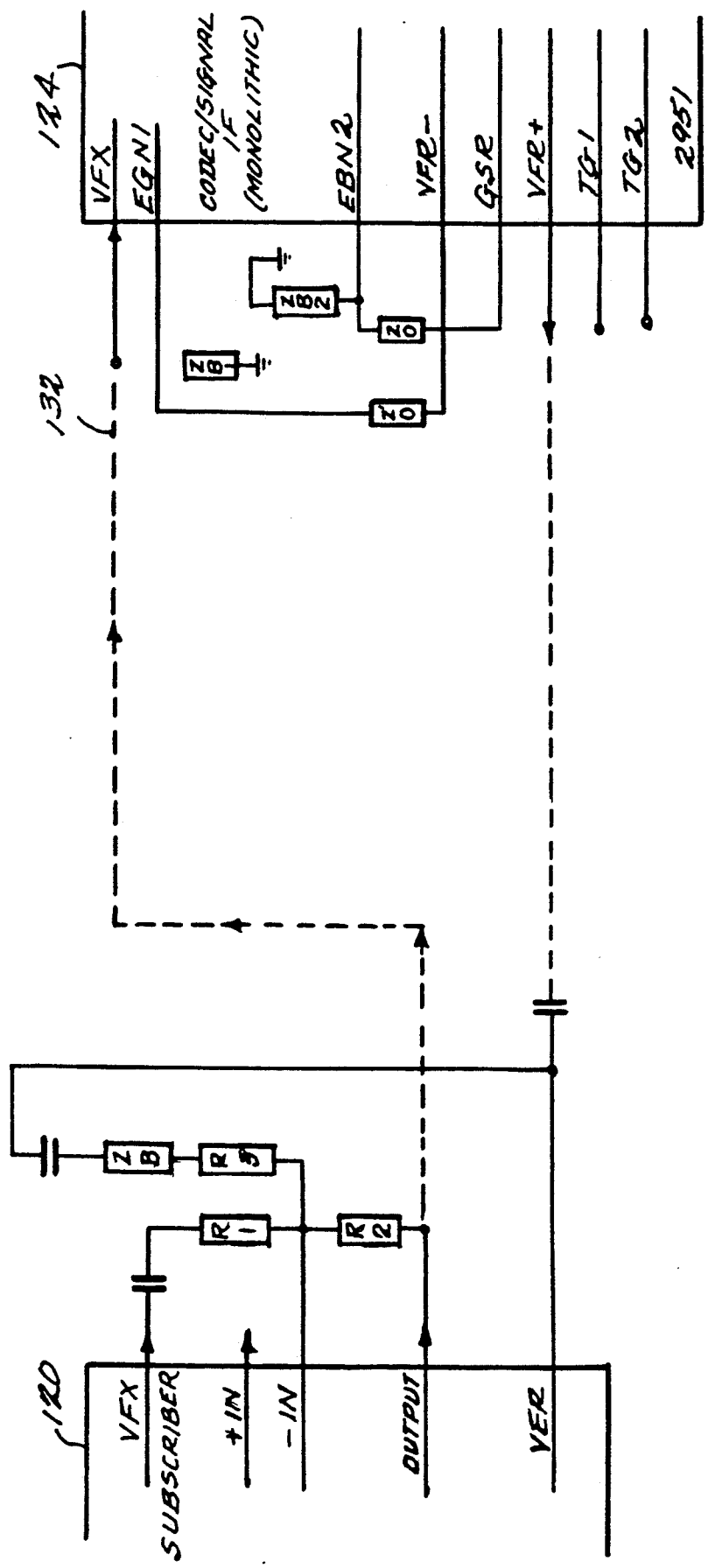
FIG. 4 shows a transhybrid balance network for use with such a system.

A more detailed description of the connection will be discussed herein with reference to FIGS. 3-5. FIG. 3 shows a detailed connection diagram between telephone set 110 and Codec 124. The T or ("tip") output of telephone set is connected through a set of break contacts of the ring relay and an 150 Ohm line feed resistor to T and TF inputs on subscriber line interface circuit 120. The R ("ring") output of telephone set 110 is connected through a 150 ohm resistor to the R input of subscriber line interface circuit 120. A 1K Ohm resister and 1 uF capacitor are provided across the contacts of the relay for arc suppression. The TF pin on the subscriber line interface circuit 120 is connected through a 150 Ohm line feed resistor to the tip (T) pin of subscriber line interface circuit 120. This TF pin provides a ground for line power. The "R" (ring) output of the telephone set is connected to the "R" input of the SLIC through a 150 Ohm resistor. The "RF" (ring feed) pin provides negative battery for line powering through a 150 Ω resistor to the "R" pin of the SLIC.

The combination of the 150 Ω resistors on the tip and ring side of the line provides a balanced 600 Ω battery feed to the subscriber line, to power the telephone set.

The "T", "TF", "R", and "RF" pins on the SLIC are internally resistively coupled to a transversal amplifier that has an output which is proportional to the loop current. This circuit is used for off-hook detection and current limiting.

The "RFS" (ring feed sense) pin is a high impedance input that is used to detect off-hook during the ringing interval.

Activation of the ringing relay connects GRD to the tip side of the subscriber's line and 90 volt, 20 Hz., −24 volt battery biased A.C. ringing current through two 150 Ω resistors to the ring side of the subscriber's line.

The connections between subscriber line interface circuit 120 and Codec 124 are also shown in FIG. 3. The codec/signal interface has 10 signal pins for logic signals; three are designated as inputs, three are designated as outputs, and four are programmable as either. Signal R-1 through signal R-N are outputs, signal X-1 through signal X-N are inputs.

These pins are customer assignable and the signal interface does not care what their function or assignment is—it merely monitors the status of the inputs and passes that information on to the secondary controller; it also takes information from the secondary controller and passes it on as outputs to SLIC 120.

The "VFX" pin is the voice frequency transmit side of the 4W analog circuit (referenced to ground).

The VFR+ and the VFR− are differential voice frequency receive terminals of the 4W analog circuit. They are presented differentially to facilitate an external transhybrid balance network.

The "VFR" pin on SLIC 120 is a single-ended (referenced to ground) input from the transhybrid balance network.

The EBN-1 and EBN-2 pins on the codec/signal interface 124 are external balance network connections 1 and 2. There are also three internal balance networks within the codec/signal interface chip that may be programmed for normal line balancing purposes—the external balance networks are for complex line matching. The codec/signal interface 124 has an internal interpolation capability that allows the user to program in a coefficient that will allow line matching in between the two external networks (for instance, see Intel 29C50/29C51 feature control combination manual pages 5-7).

The "TG-1" and "TG-2" pins are used to externally set the transmit gain.

The "GSR" pin is used to externally set the receive gain.

The 29C51 also has the capability to control the transmit and receive levels from the externally set levels 12 db in 0.5 db increments. This is done through feature control bytes from the secondary controller.

Transhybrid balance network 134 is disposed between Codec 124 and subscriber line interface circuit 120. This transhybrid balance circuit 134 is shown in detail in FIG. 4, between Codec signal interface 124 and subscriber line interface 120. The purpose of this transhybrid balance circuit is to balance the 2/4 conversion and minimize crosstalk. Values for this transhybrid network are:

$R1=R2=R3=100K$ Ohms, 0.1% match, 1.0% absolute value
$ZB \rightarrow$ Ohms
$C^5=0.5$ μF, 20V
$C^6=C^7=0.5$ μF, 20V, 10% match
$ZO=900$ Ohms, 1%
$ZB_1=R10//R11$ series c/o
$ZB_2=R20//R21$
$R10=1650$ Ohm
$R11=100$ Ohms
$R20=800$ Ohms
$R21=100$ Ohms
$C10=0.005$ μF FIG. 5A shows the detailed connections between Codecs 124 and 126 and secondary line controller 128. For purposes of FIG. 5, Codec 124 is assumed to be Codec 0 with Codec 126 assumed to be Codec 7. Accordingly, secondary line controller 128 can accommodate Codecs 1-6 in addition to those shown.

Typical commercially available integrated circuits to perform the function performed by appropriate blocks in the FIGS. 1-5A are set forth on these block diagrams. More specifically, subscriber line interface circuit 120 can be embodied by an integrated circuit 5508 made by Harris Company. Codec 124/126 can be embodied by a 2951 IC made by Intel Corp. Secondary line controller 128 can be embodied by a 2952 IC of Intel Corp.

In operation, the analog voice signals from telephone 110 are converted to four-wire signals, and filtered, pulse amplitude modulated, sampled and digitally encoded using standard "mu" or A-law techniques by Codec 124. This sampled information is passed to secondary line controller 128. The data circuit may typically use an RS232C interface having protocol and baud rate compatibility with the terminal on the other end.

The transmit data is buffered and passed to the secondary line controller.

Secondary line controller 128 is also associated with microprocessor 140, which operates to control SLC 128.

When using a data set, three options are available to the user with this system:

1. 50-9600 Baud user controllable by activating his line feed or carriage return twice with his terminal conFIGUREd as follows: ASCII—one start bit, eight data bits, with the eighth bit always "O", no parity, and one stop bit. Option "A" requires the use of an 80C52 or equivalent microcontroller, 1488 and 1489 combination as line drivers and receivers, parallel/serial and serial/-parallel convertors, time slot assigner (54HCT138), and a two line to single line converter (54HCT125).

Figure 5B:
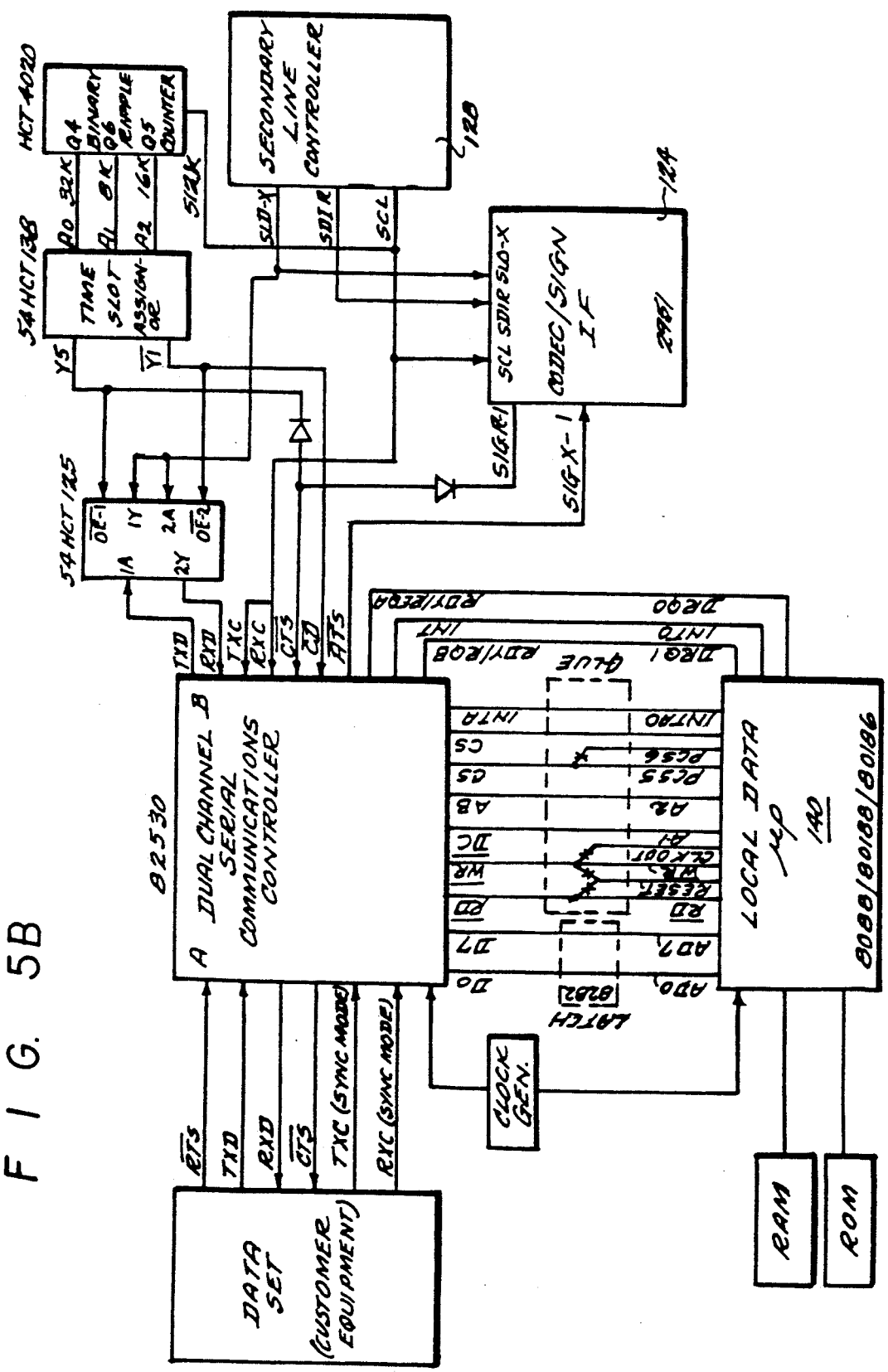
FIG. 5B shows a detailed block diagram of an alternative embodiment.

2. 1200-64,000 Baud user controllable by response to prompts provided by the local data microprocessor to the user. Protocol is controllable in the same manner: i.e., SDLC, BISYNC, ASYNC, and CCITT X.25. The data set interface can also be programmed by the user for NRZ, NRZI, or FM encoding and decoding (default is NRZ encoding and decoding, ASYNC, 1200 baud, seven bit character, no parity, 1 stop bit). The block diagram for Option "2" requires additional circuitry, as shown in FIG. 5B.

3. 64,000-1.92 mega baud synchronous bandwidth on demand in 64 kilobaud increments where end-to-end facilities permit; otherwise, 56,000-1.344 mega baud in 56,000 baud increments. Again, this rate is user controllable through prompts from the local data microprocessor.

Option 3 circuitry is similar to Option 2 with the following exceptions:

a. The eight channel time slot assigner (54HCT138) is replaced with a 32 channel unit.
b. The 512K transmit and receive clock is replaced with a 2.048 MegaHertz clock.
c. The SLD-X line is replaced with two lines to a memory time switch (Siemens PEB2040 or an equivalent).
d. The two line to single line converter (54HCT125) is not required.
e. The memory time switch has its own microcontroller (80C32).
f. A data link is required between the local data microprocessor and the memory time switch microcontroller. A bus transceiver between the two microprocessors using port one interface on the 80C32 to the 8 bit data bus of the local data microprocessor will suffice.
g. A gating circuit is required between the TSA and the input and output enable pins (CD and CTS) of the 82530 to control the 64 K bit time slot usage.

The operation of the system involves the assignment of each telephone conversation to a particular one of two PCM highways. Within the assigned PCM highway, the information will occupy an assigned time slot in consecutive 8-bit words. In this embodiment, two PCM highways are shown as outputs of the secondary line controller 128. In the system, once voice and data have been properly encoded into 8-bit information, they are indistinguishable, and are treated exactly the same.

The PCM highways and control bus are connected from secondary line controller 128 both to multiplexer 142 and demultiplexer 144. The structure used in this embodiment is a single chip multiplexer/demultiplexer 145 made by Siemens Company, model no. PEB2040.

This chip takes four 2.048 megahertz bit streams in and multiplexes them into a single 8.192 megahertz outgoing bit stream and vice versa.

The hook-up of this multiplexer circuit is shown in FIG. 5C. A programming guide to this circuit follows in Tables 1 and 2.

TABLE 1

PEB 2040 PROGRAMMING (4:1 MUX)

```
        DB7                          DB0
         B    Z   X   RY  0   0   0   0
B  = 1   Chip busy during command execution
Z  = 1   Incomplete command instruction
RY = 1   Mode register blocked (after "power on")
MODE SET: A0 = 0, RD = 1, WR = 0, CS = 0
        DB7                          DB0
         R   TE   0   SB  MI1 MI0 MO1 MO0
R  = Reset
TE = Tri-state enable
SB = Standby
MEMORY MAP: A0 = 1, RD = 1, WR = 0, CS = 0 (WRITE CM)
        DB7
BYTE 0   X    X   K1  K0  X   X   X   S8  KEY WORD
BYTE 1   S7   S6  S5  SR  S3  S2  S1  S0  SM ADDR
BYTE 2   C7   C6  C5  C4  C3  C2  C1  C0  CM ADDR
   BYTE 0 = 20 H (00100000) Write Conn. Mem.
   BYTE 1 = 79 H (00111,1001) Set SM Ch #7, Inc Line #9
   BYTE 2 = (11111101) Set CM Ch #126, OG Line #1
```

TABLE 2

MEMORY MAP 4:1 MUX PEB 2040

| INC CH (SM) | OG CH (CM) - INC CH (SM) | OG CH (CM) |
|---|---|---|
| (Line 0,2,4,6) 0 | Line 0  0,32,64,96 | (Line 1,3,5,7) 0 |
| 1 | 1,33,65,97 | 1 |
| 2 | 2,34,66,98 | 2 |
| 3 | 3,35,67,99 | 3 |
| 4 | 4,36,68,100 | 4 |
| 5 | 5,37,69,101 | 5 |
| 6 | 6,38,70,102 | 6 |
| 7 | 7,39,71,103 | 7 |
| 8 | 8,40,72,104 | 8 |
| 9 | 9,41,73,105 | 9 |
| 10 | 10,42,74,106 | 10 |
| 11 | 11,43,75,107 | 11 |
| 12 | 12,44,76,108 | 12 |
| 13 | 13,45,77,109 | 13 |
| 14 | 14,46,78,110 | 14 |
| 15 | 15,47,79,111 | 15 |
| 16 | 16,48,80,112 | 16 |
| 17 | 17,49,81,113 | 17 |
| 18 | 18,50,82,114 | 18 |
| 19 | 19,51,83,115 | 19 |
| 20 | 20,52,84,116 | 20 |
| 21 | 21,53,85,117 | 21 |
| 22 | 22,54,86,118 | 22 |
| 23 | 23,55,87,119 | 23 |
| 24 | 24,56,88,120 | 24 |
| 25 | 25,57,89,121 | 25 |
| 26 | 26,58,90,122 | 26 |
| 27 | 27,59,91,123 | 27 |
| 28 | 28,60,92,124 | 28 |
| 29 | 29,61,93,125 | 29 |
| 30 | 30,62,94,126 | 30 |
| 31 | 31,63,95,127 | 31 |

The 2952 controller chip, SLC 128, performs the first stage of MUX/DEMUX. The individual time slots are MUX/DEMUXed onto and off of one of the two 2.048 MHz PCM highways. SLC 128 also performs time slot assignment under control of the CPU via the HDLC link.

The remaining structures in FIG. 2 will now also be described. Optical receiver 146 receives information from optical cable 90, which is a single mode fiber carrying information of 1300 nanometers in this embodiment. This information is received by optical receiver 146, and is output both to demultiplexer 144 and to a clock extractor 148. A typical ring synchronizing circuit is shown in FIG. 5D, including ring generator 900, zero crossing detector 902, codec 124, AND gate 904, and SLIC 120. This ring synchronizer allows ringing at the subscriber premise to be in sync with ringing pulse coming from the central office.

The operation of this ring synchronizer will now be discussed. Ring generator 900 produces the ring generation tone on a constant basis. Therefore, the output ring generator 900 is an 86 volt peak continuous signal at a frequency of 20 hz. Each time this 20 hz signal crosses zero (that is 20 times per second), zero crossing detector 902 outputs a pulse. This pulse is used later in the circuitry, and will be discussed herein. Local microprocessor 140 also periodically receives an indication from the central office indicating that a ring should begin. Based on this indication, microprocessor 140 produces an output to CODEC 124. CODEC 124 produces a 2-second on 4-second off pulse signal in response. This signal is supplied to one input of an AND gate 904 and to the secondary line interface card 120. The other input of the AND gate 904 receives the output of the zero crossing detector. The output of the AND gate 904 operates as a ring sync input to the secondary line interface controller 120.

SLIC 120 produces a ring command output only when the ring command is produced by the CODEC signal interface, and when an output is produced by AND gate 904. That is, this ring command output from SLIC 120 occurs only when a zero crossing pulse of the ring generator has been detected, and the ring has been commanded by the local microprocessor. At this time, an output is produced and coupled to ring relay 906, enabling ring relay 906 to conduct the output of ring generator 900. As a result, the ring generator output is coupled to ringer 908.

The effect of this is that the ring command from the central office is synchronized with the ring sent to the subscriber. Furthermore, the initiation of this ring is synchronized with the leading edge of a first ring cycle. All of this synchronization is performed at the local network.

This has two advantageous effects. First of all, the ring relay is turned on only at a zero crossing of the ring generator output. As such, the time at which the ring generator is turned ON is a time at which the ring output is relatively low. Therefore, this output, which will typically be one to two volts, is coupled to the ringer, and ramps up with the ringer already attached thereto. Therefore, the power switching capability of the ring relay does not need to be as great. The ring relay need not be required to withstand an 86 volt peak signal switched onto full load thereacross. Rather, the ring relay will only be switched into conduction when the voltage of the ring generator is relatively low. Furthermore, this reduces the inductive kickback of the ringer. Since ringer 908 includes an inductor as one of its operative parts, an inductive kickback pulse of up to 200 volts would be produced if the 86 volt peak signal were merely coupled across the ringer. According to the present invention, the ring relay turns on at a time when the voltage will merely ramp up across ringer 908, and therefore this inductive kickback will be minimized.

The clock information is sent to multiplexer/demultiplexer 145 and to network synchronizer 150. This network synchronizer is connected to the multiplexer/demultiplexer 145, to microprocessor 140 and to the optical transmitter 152. This synchronizer will be discussed in detail later in this specification.

The output of optical transmitter 152 is coupled to a multimode to single mode converter 154 which will also be discussed in detail herein (with reference to FIG. 7). The output of multimode to single mode converter 154 is connected to optical fiber 92 which carries information of a frequency of 820 nanometers in this embodiment.

Figure 6:
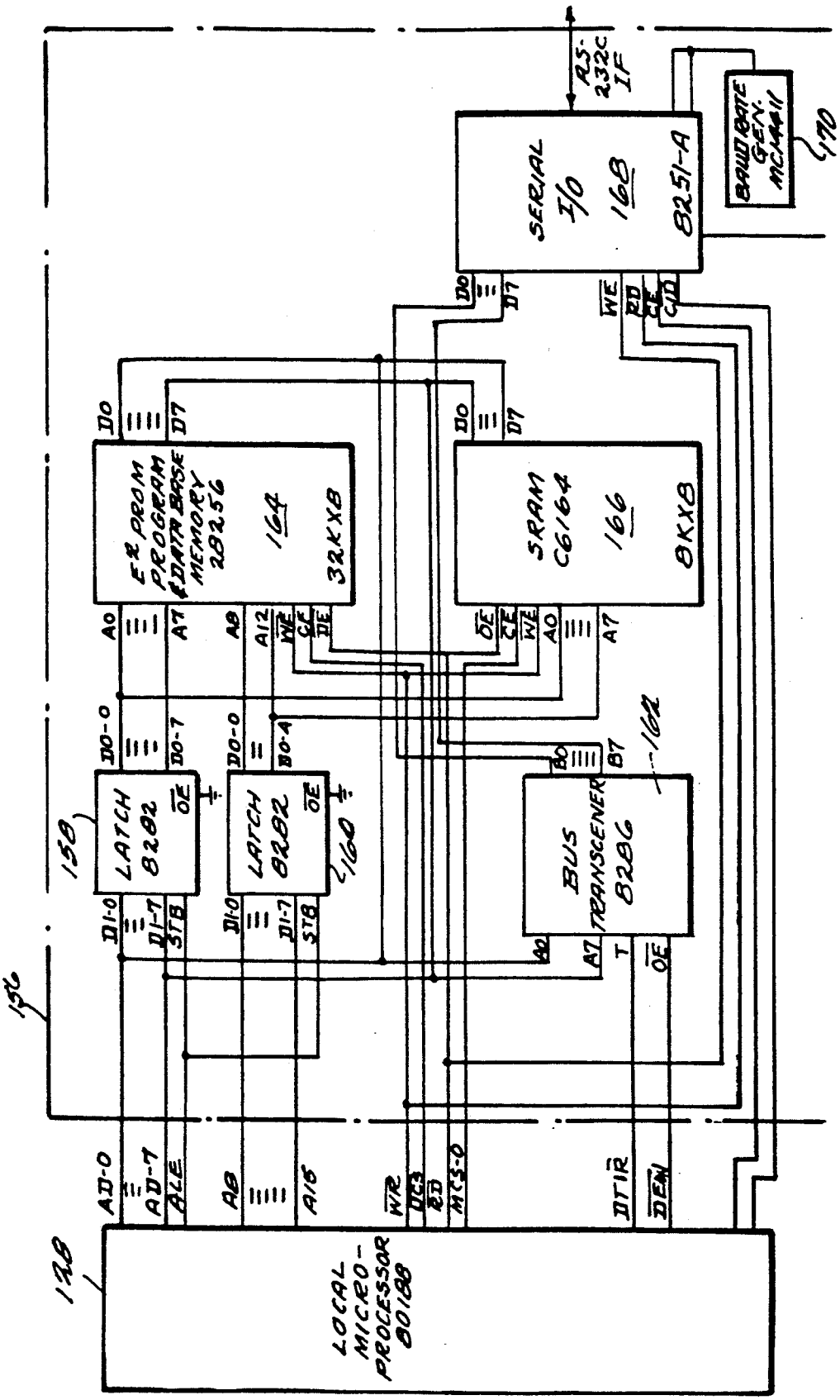
FIG. 6 shows a layout of the local microprocessor and memory.

The microprocessor 140 is connected to memory and interface circuitry 156. A detailed drawing of this configuration is found in FIG. 6. In this embodiment, microprocessor 128 is embodied by a processor of the INTEL 80188 type. Memory and interface circuitry 156 is shown in detail as including two latches, 158 and 160, a bus transceiver 162, EE PROM 164 which includes the program and data base memory, static RAM 166, Serial I/O 168 and a baud rate generator 170. In this embodiment, the latches are embodied by, for example, an integrated circuit of the INTEL 8282 type. The bus transceiver 162 is embodied by an integrated circuit INTEL 8286, with the memories being embodied by 28256 and C6164, respectively. The serial I/O structure is embodied by an 8251A, with the baud rate generator being embodied by a MC14411 (Motorola).

In operation, when the subscriber goes off-hook, subscriber line interface 120 detects whatever indication is produced by the telephone indicating this subscriber having gone off-hook. In this embodiment, a loop current is produced in excess of 14 milliamps, which is detected by subscriber line interface 120. This detection corresponds to the off-hook condition of the telephone. Upon detection of the off-hook, subscriber line interface 120 generates an off-hook signal (SHD) and couples the signal to Codec 124.

Codec 124 then encodes and clocks the off-hook detect signal to secondary line controller 128. Secondary line controller 128 analyzes the data using last look logic to determine a type of change, and which subscriber initiated the change. Based on this last look logic processing, a determination is made as to whether the off-hook has just begun or is continuing, and which subscriber initiated the off-hook. Secondary line controller 128 also checks to determine if the off-hook is for originating a call or for response to an incoming ringing signal.

Once the type of change has been processed, secondary line controller 128 transmits a message to microprocessor 140. This message includes subscriber address, associated central office address, off-hook, call originate/terminate and class of service.

Microprocessor 140 sends this information to the primary microprocessor (to be discussed later in this specification). The primary microprocessor determines the proper PCM highway, time slot, class of service, etc., and sends a message back to secondary microprocessor 140.

Microprocessor 140 then sends a message to secondary line controller 128 which determines the proper PCM highway and time slot. As discussed in the flowcharts, this is done by choosing the next available time slot. Based on this information, the secondary line controller sends the proper information to the proper PCM highway and proper time slot. This operation will be more fully discussed herein in discussion of FIGS. 17-19.

A preferred embodiment of this invention uses optical fibers. In optical fibers, there are typically two types of modes. One such type is used in the multimode fiber, which is a typically wider light pipe so that light will bounce down the pipe. This causes different modes to propagate along the pipe. In contrast, a single mode pipe is relatively thin since only a single mode is propagated.

Many problems have existed in the prior art in attempting to couple one type of fiber to the other. In fact, no inexpensive way has been known to do this.

It is also desirable to use an inexpensive 820 nanometer LED as the optical transmitter at the subscriber premise. This 820 nanometer LED will launch voice and data signals back to the central office, and is relatively cheap. However, an 820 nanometer LED must launch into a multimode fiber which is highly undesirable for the present application, because of the limited bandwidth of the multimode fiber. Furthermore, it is undesirable to have to purchase mixed multi- and single-mode fibers. This costs more and, in fact, limits the flexibility of the system.

According to the present invention, light signals from the LED transmitter 152 are first launched into fiber 156, which is a multimode fiber of 50/125 type or similar. This fiber is then processed in the way shown in FIG. 7.

Specifically, the multimode fiber of the 50/125 type has a 50 micrometer core and a 125 micrometer clad. The outer end of fiber 156 is then heated and drawn at an angle $\theta$, where $\theta$ is an angle of approximately 12° in the present embodiment. This is drawn until it is approximately 1/5 of its original size.

The effects are as follows. Cable 156 includes clad 158 and core 160. As discussed above, core 160 is approximately 50 micrometers. However, it is desirable to launch eventually into a single-mode fiber of type 10/125 which has a 10 micrometer core. By drawing the cable until the outer dimension is approximately 1/5 of the inner dimension, the size of the core will be correspondingly decreased. In fact, the core at location 162 will be substantially equal to 10 micrometers, so that it may be launched into cable 92.

The 10 micrometer end is cleaved and aligned to a single mode 10/125 micrometer fiber using a light injection/detection system, or by using a LED as a light source with a power meter at the far end of the single mode fiber. The junction is then set using fusion or epoxy type splicing methods.

Once coupled to the single mode fiber, the information is sent to the trunking and optical fiber cable 100.

This is shown in further detail in FIG. 8. FIG. 8 shows the basic operation according to the trunking and local distribution system of the preferred embodiment voice/data system. Optical transmitters such as optical transmitter 152 are connected to an optical coupler 170. A second optical transmitter 172 is connected to a optical coupler 174. It can be seen that many more of these optical transmitters and couplers are possible. All of these transmitters and couplers are coupled together into fiber 92 and coupled to the central office location where they are received by optical receiver 200.

The transmit system transmits from optical transmitter 202 at the central office location to fiber 90, to a plurality of optical receivers. These optical receivers are coupled off of fiber 90 using optical couplers 176 and 178. Optical receivers 146 and 180 are shown, however there may be many more optical receivers operated as shown in FIG. 8.

Figure 9:
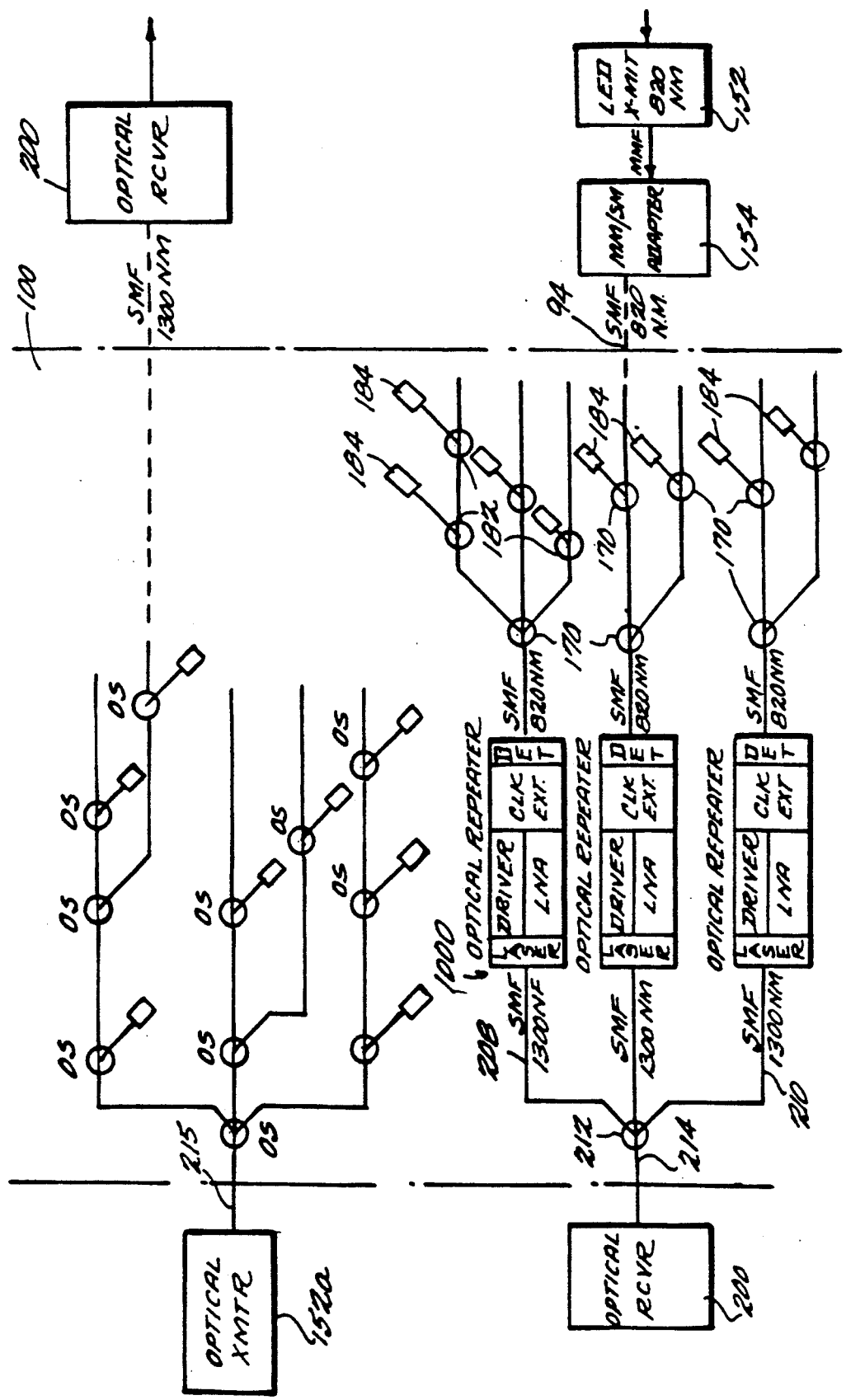
FIG. 9 shows a more detailed view of the trunking and distribution optical fiber cable of FIG. 8.

A more detailed drawing of this system is shown in FIG. 9. FIG. 9 shows optical transmitter 152 and multimode to single mode adapter 154. Cable 94 is then coupled to trunking and local distribution 100. This system is coupled into optical coupler 170 as shown in FIG. 8. Other similar optical transmitters may be also coupled to the other inputs of the optical coupler. A plurality of optical couplers 182 are shown in FIG. 9. Each of the optical couplers is connected to a different premise equipment designated as 184.

Figure 10:
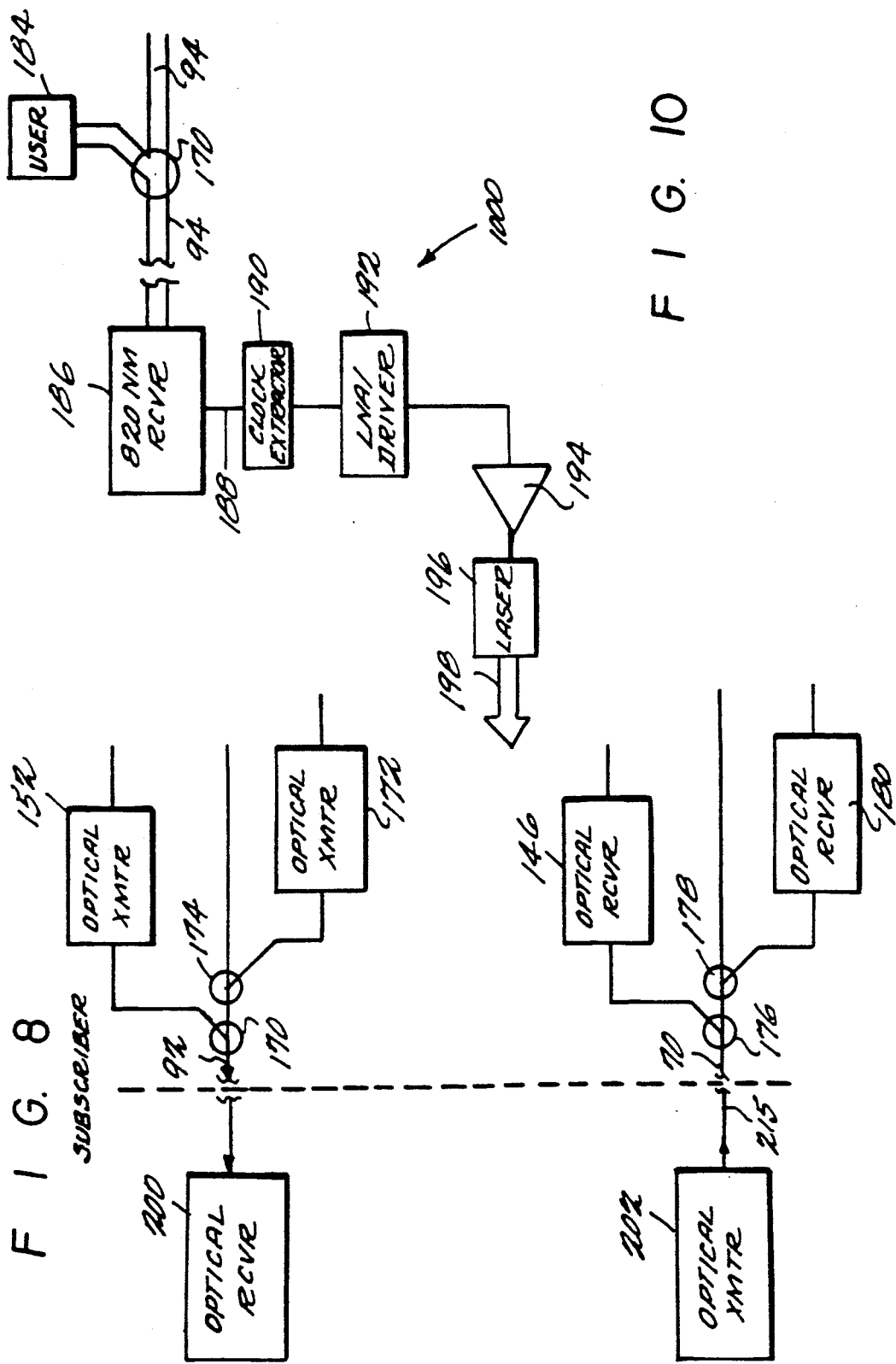
FIG. 10 shows a diagram of the optical repeater according to the present invention.

The fiber 94, after having a plurality of signals coupled thereto is coupled to optical repeater 186. A more detailed diagram of the repeater 186 is shown in FIG. 10. Cable 94 is shown as entering optical coupler 170 coupled to another subscriber equipment 184. Cable 94 which, in this embodiment, is carrying 820 nanometer LED light, is then a mainstream fiber, and has a plurality of inputs from multiplex subscriber units.

These coupled signals are then transmitted along the mainstream fiber for a certain distance until the light power has lowered sufficiently so that it should be repeated. This light power, however, is still within the input threshold of an 820 nanometer optical receiver. This optical receiver can typically be an avalanche photodiode or a pin diode. The signals are converted in this optical receiver 186 from the 820 nanometer input to an electrical output as signal 188. The signals are then regenerated using normal PCM regeneration techniques using for example, a clock extractor 190, and LNA 192. The signals are then output to a regenerator 194 and coupled to a 1300 nanometer laser 196. This 1300 nanometer laser outputs the signals onto cable 198. As can be seen (FIG. 9), signals appearing on a plurality of cables 198, 208 and 210 are coupled by optical coupler 212 into a single cable 214. This cable is then routed to optical receiver 200 at the central office location.

FIG. 10 shows the optical repeater 1000 as shown in FIG. 9. This optical repeater 1000 includes the fiber cable 94, and optical splitter 170, coupling at least one user 184 to the fiber cable 94. Fiber cable 94 is received by an 820 nanometer receiver 186. The output of this receiver is coupled to clock extractor 190, which is coupled to LNA driver 192. The output of the LNA is amplified by amplifier 194, and then launched by laser 196 into a further fiber 198.

Figure 11:
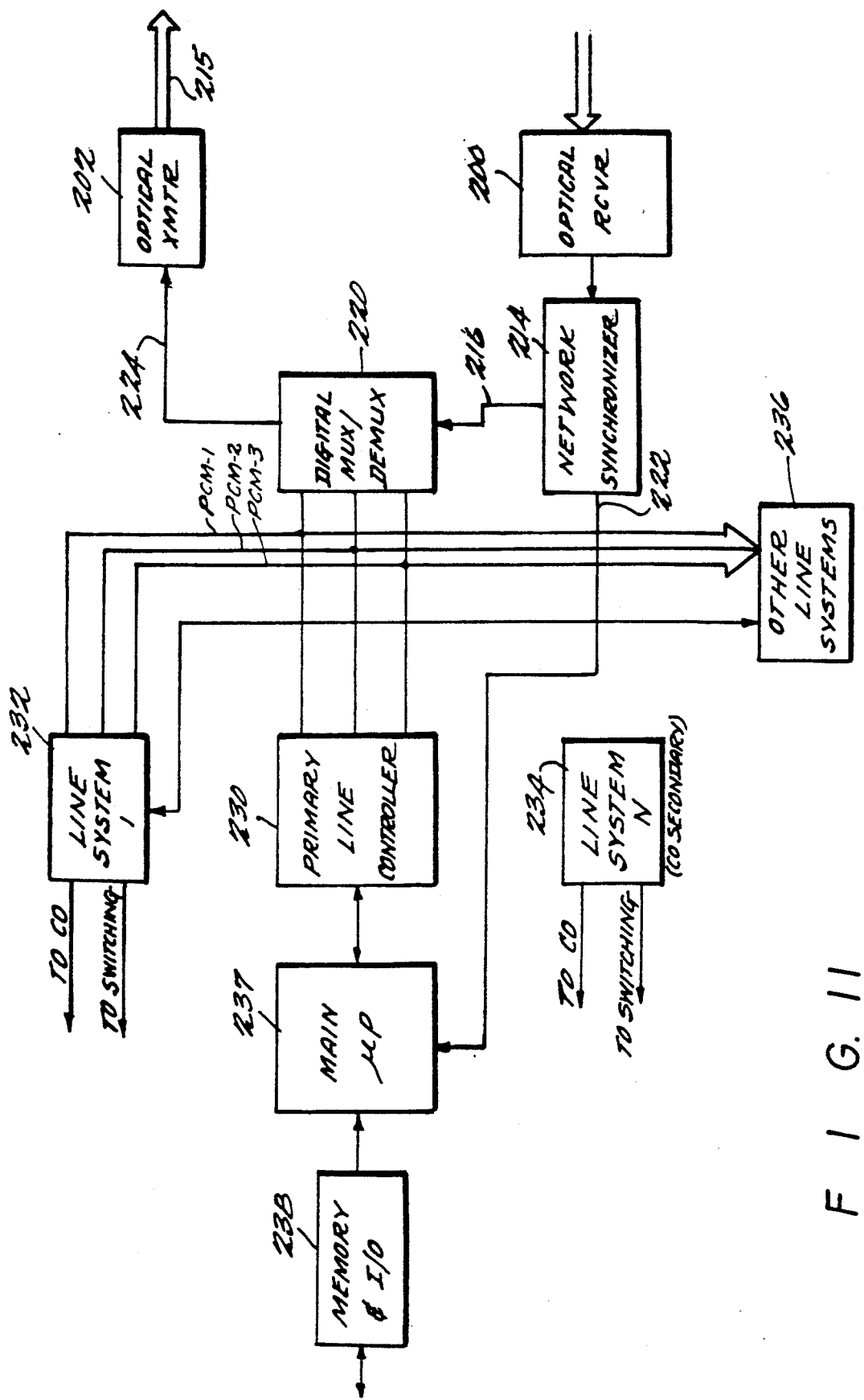
FIG. 11 shows a diagram of the central office system.

FIG. 11 shows the central office voice data system layout. Information is received by optical receiver 200 and transmitted by optical transmitter 202. The received information from optical receiver 200 is coupled to network synchronizer 214. This network synchronizer 214 cooperates with the network synchronizer 150 at the voice/data premise equipment to synchronize the system. Network synchronizer 214 has a data output on line 216 which is coupled to the digital multiplexer/demultiplexer 220. Network synchronizer 214 also has a synchronization output 222 which will be discussed further herein.

Digital multiplexer/demultiplexer 220 also has inputs from the PCM highways, PCM1, PCM2 and the control highway CTL. These PCM highways are further multiplexed into a multiplexed line 224 which is coupled to optical transmitter 202 that transmits to optical cable 215. The PCM highways, PCM1, PCM2 and CTL are also connected to the primary line controller 230 and to first line system 232 and the nth line system 234. While only two line systems 1 and n are shown in FIG. 11, a large number of line systems may be similarly accommodated as shown by element 236 representing other line systems.

The primary line controller 230 is also connected to main microprocessor 237. Main microprocessor 237 has an associated memory and I/O section 238.

The network synchronizer output 222 is coupled to main microprocessor 237.

Figure 12:
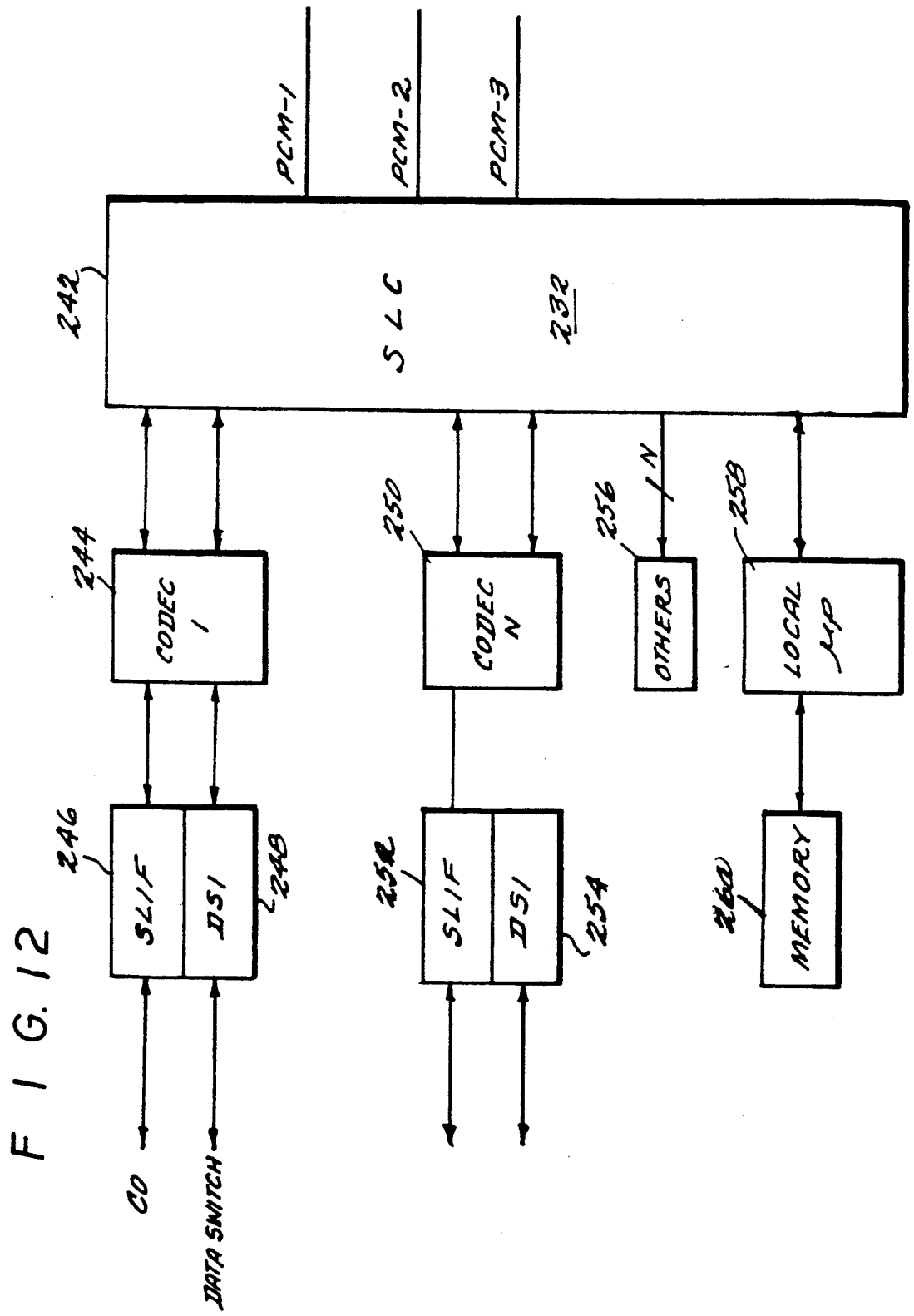
FIG. 12 shows a detailed layout of one line system.

The line system 232 will be described herein with reference to FIG. 12. As discussed previously, the line system includes three PCM highway inputs, PCM1, PCM2 and CTL. These inputs are coupled to secondary line controller 242. Secondary line controller 242 is adapted, as in secondary line controller 128 of the voice data premise equipment, to handle a plurality of line calls. Again, only numbers 1 and n will be shown herein for convenience. Secondary line controller 242 is connected to Codec and signal interface 244. A voice portion of the information is connected to a subscriber line interface 246. The data portion of this information is connected to a data switch interface 248. The outputs of these devices are adapted to be connected to the existing central office location. Thus, as described, this device can replace existing equipment which now exists between the existing central office location and the user. The other shown output of the secondary line controller includes analogous structure of the nth Codec 250 as well as subscriber line interface and data set interface 252 and 254. An element 256 is provided herein to represent the others of the Codecs, etc.

Each secondary line controller 22 also includes an associated local microprocessor 258. This local microprocessor also includes memory 260.

It is desirable from a reliability and ease of reprogramming standpoint that all memory be provided in EE PROM.

Figure 13:
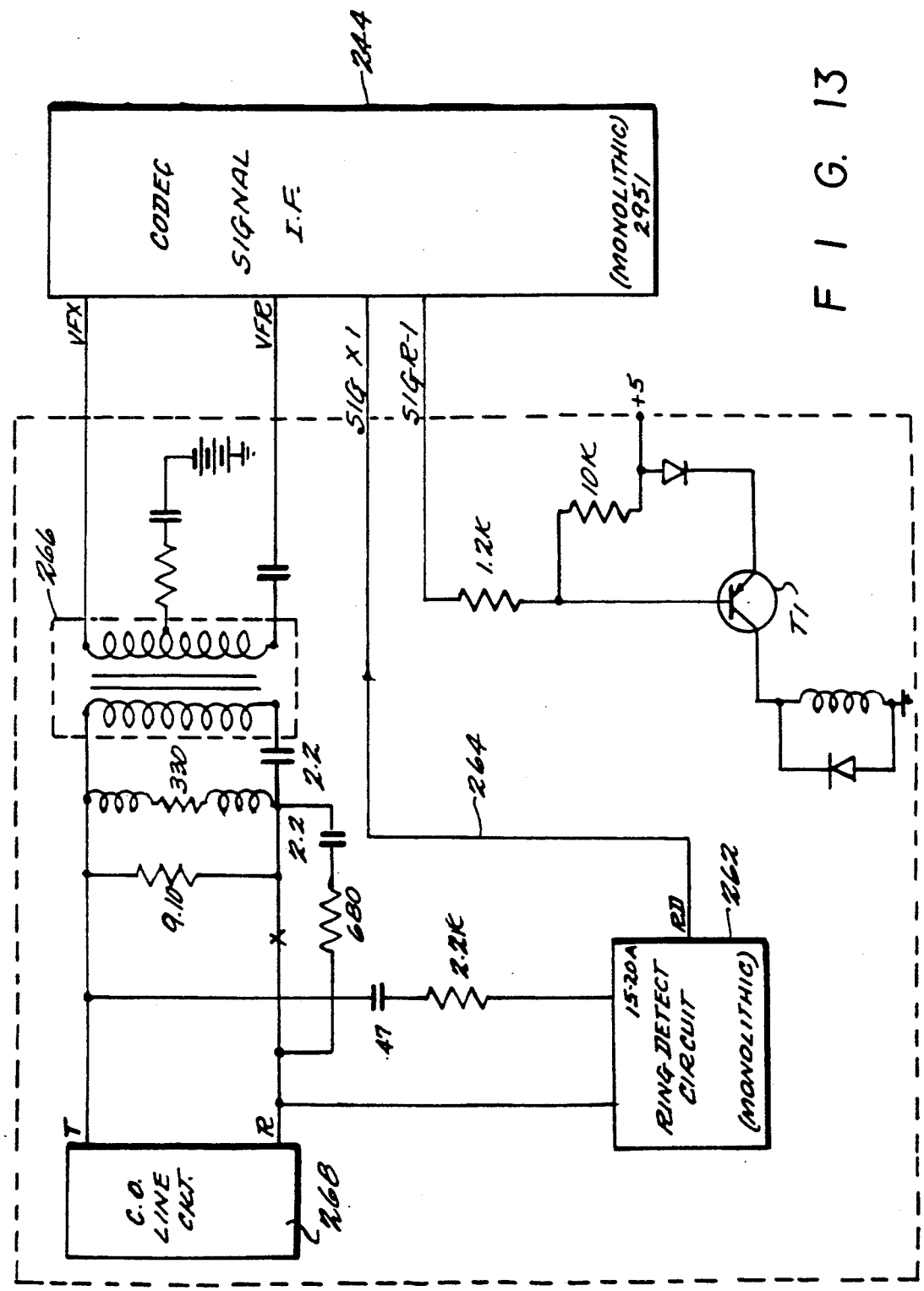
FIG. 13 shows the interface between the Codec and central office line circuit.

FIG. 13 shows an interface between the codec and central office subscriber line interface 246. Codec signal interface 244 is formed from an INTEL 2951. This structure receives +5V on pin X-1 to detect a ring. This structure also produces an off-hook indication pin R-1, which is attached to relay drives T1 and relay K1. Subscriber line interface 246 includes a ring detect circuit 262 which sends +5 volts out through line 264 when a ring is detected. Central office line circuit 288 includes the standard twisted pair, tip and ring. Also included is a two to four wire conversion structure 266. Appropriate values for the particular devices are shown with resistor values in ohms and capacitor values in microfarads.

The operation of voice/data central office system 104, in conjunction with voice/data premise equipment 108 will now be summarized. This is discussed in detail with reference to the flowcharts of FIGS. 17-19.

As discussed above, when a subscriber goes off-hook, this is detected by subscriber line interface circuit 120 at the subscriber premise equipment location. Secondary line controller 128 at the premise location then sends a message to main microprocessor 237 using the control PCM highway CTL. This message includes the subscriber address, the associated central office address, off-hook, call originate and class of service. Therefore, when this change occurs, the message is sent on the control PCM highway to main microprocessor 237.

Main microprocessor 237 is continually doing circular polls of all remotes in order to obtain this information. Microprocessor 140, at the subscriber location, waits for a poll, and sends the above discussed information in a response to a poll. The primary microprocessor then assigns a transmit time slot, receive time slot and PCM highway. The secondary line controller with its internal time slot matrix and switches, effects this particular operation.

Therefore, when main microprocessor 237 detects an off-hook, it instructs a proper line system to provide an off-hook signal to the central office. In response, the central office sends a dial tone as a return message, and this dial tone is multiplexed to the subscriber. Upon receipt of the dial tone, the subscriber can begin dialing.

Secondary line controller 128 monitors the off-hook detect signal generated by secondary line interface circuit 120. Any time there is a change in the signal, the status is timed until the next signal. When an interdigital pulse is encountered, a message is sent via the microprocessor 140 to the central office to pulse that digit into the central office. This continues until all digits have been dialed and the central office then completes the calling process.

A different technique is used for a touch tone phone. The secondary line controller 128 similarly monitors for the off-hook detect signal. However, in a touch tone phone, secondary line controller 128 times the original off-hook for five seconds and detects no status change, because the touch tone signals are transmitted via the voice path. Therefore, secondary line controller 128 ignores this operation under the assumption that the central office will issue a time-out if no valid call exists.

To initiate a call to the subscriber location, the following operation occurs. First, central office line circuit 288 passes a ring signal which is detected by the ring detect circuit 262. When ring is detected, a +5 volts is sent to pin x1 (sig x-1) of Codec 244. This encodes and clocks the signal to the associated secondary line controller 242.

The secondary line controller 242 analyzes the incoming signal using last look logic techniques, and determines the type of change and which subscriber initiated the change. Upon recognizing a ring detect, the secondary line controller 242 sends a message to main microprocessor 237. This message includes the central office line circuit address, the associated subscriber address to which the call belongs, the ring detect and the class of service. Based on this information, main microprocessor 237 assigns a transmit and receive time slot. This information is also sent to secondary controller 128 and microprocessor 140 at the premise equipment. The premise equipment circuitry then connects the subscriber to the assigned time slot, and instructs the secondary line interface 120 to apply a ringing current to the called party at a particular rate.

At the time the called party answers, the off-hook signal is detected by secondary line interface 120, passed to Codec 124 and to secondary line controller 128. Secondary line controller then sends a message via the control PCM highway to main microprocessor 237. This message includes subscriber address, associated central line circuit address terminating call, and off-hook. At this time, secondary line interface circuit 120 terminates the ringing to the subscriber, since the off-hook has been detected. Similarly, at the central office, the associated secondary line controller 242 will instruct central office line circuit 288 to generate an off-hook to the central office. This completes the voice path between the subscriber equipment and the central office, and the parties can now converse.

Data signalling is accomplished in a similar way. A subscriber bringing the data terminal on line produces a request to send or RTS signal to the data set IF 122. In the preferred embodiment of the present invention, the subscriber initializes the data terminal to the microcontroller in the data set IF as follows.

The subscriber must initialize the data terminal to his microcontroller by the following:

Start Bit—7 data bits—parity—one stop bit before he comes on-line. After he brings his terminal on line he will have to strike the "LF" or "CR" twice for microcontroller to adjust to his baud rate (300-64,000 baud). After the micro controller had determined the baud rate it will respond with:

| # of Data Bits ? | _____ | (7, 8, ESC) |
| Parity ? | _____ | (0, E, or N (None) |
| # of Stop Bits? | _____ | (1,2) |

This procedure will allow the subscriber to adjust his terminal to his preferred set-up. Should the subscriber wish to change his baud rate again, all he has to do is go off line then back on line and strike his "LF" or "CR" twice. If he does not wish to change his set-up also, he should strike this escape key after the prompt "#of data bits ?".

Keying any character other than "LF" or "CR" first will cause the microcontroller to assume the baud rate and set-up are the same as used on the previous transaction.

After the subscriber has received his initial "CTS" from the microcontroller, he may key in the called terminal ID code or number. Upon receipt of the called ID, the microcontroller will remove the "CTS" signal to the data terminal and compare the called terminal ID to his "Software Defined Network" (SDN) table.

The "SDN" table consists of a list of all on-net terminals and which ones the subscriber has access to.

If it is an on-net terminal that the subscriber has access to, or it is an off-net terminal, the micro controller will pass the ID and a request for service signal to the secondary controller via a P/S FIFO.

The secondary controller sends a message to the CPU and its associated central office line controller containing: originating terminal address, associated central office port address, terminating ID number, and class of service.

The CPU then sends a message to the associated line controllers containing time slot assignment. The associated line controllers connect the data terminal interface circuits to those time slots and the path is complete from the subscriber to the central office.

At the central office end, the data set interface is connected to an auto-dial modem pool for completion of an off-net call via an RS-232-C interface or to a multiplexer and digital switching matrix for an on-net call. Modem pools, of standard baud rates, are provided at the central office end based upon customer traffic requirements.

If the call is off-net and is connected to a modem, the secondary line controller associated with the central office end sends an "RTS" signal via its local data set interface to the modem which in turn sends back "CTS". The SLC then sends the terminating terminal ID code to the modem. The modem then outpulses the terminal ID number in touch tone through the telephone switching network and the switching network completes the call. The modem removes the "CTS" signal to the data set interface once it has received the terminal ID number. The "CTS" signal is returned again once the far end responds.

If the call is on-net, the data signals are gated to a digital multiplexer port which is connected to a digital switching matrix and subsequently to the terminating terminals multiplexer port on the other side of the -matrix. Since the call was predetermined to be an on-net call, the path from the terminating terminal ID to the central office and the other side of the switching matrix has been established at the same time as the originating terminal to the central office.

Once the complete path end to end has established, the "RTS" and "CTS" signals are set and the transaction can take place.

If the terminal microcontrollers detect a baud rate or character length mismatch, the call will not be completed until the originating end resets his terminal to match the terminating end. Should this mismatch occur, the originating end receives a prompt stating the terminating end's requirement.

If the terminating terminal is busy or if it is not on-line, the originating end will be notified as such with a prompt.

If the date circuit is dedicated end to end, a permanent path is set as indicated above. However, I feel that dedicated circuits will not be the norm because of cost and the availability of high speed dial-up data capability of this system. This system will allow nondedicated hot line or ring down type data service at a much reduced cost over that of dedicated service.

As has been discussed above, the voice and data signals are both encoded into eight bit words according to the preferred embodiment. Once encoded, these signals are multiplexed onto a particular time slot of a particular PCM highway. Main microprocessor 237 maintains a memory map of all the active users and their assigned time slots as well as records of the type of call, call origination time call, termination time, baud rate, originating and terminating ID and other important information which is used for billing and traffic engineering purposes. Each secondary line controller 128 can serve up to 16 ports of voice and data, and switch any port to any time slot on either of the PCM highways. Although the best mode as described herein includes two PCM highways, different applications may in fact use one, two or three PCM highways between the central office and subscriber location.

The dual highway approach can be configured in two ways:
1. One highway is dedicated for voice/data and the other is for signal/control information.
2. Signal/control information is interleaved in one or two time slots on one or both highways in both directions.

The triple highway approach allows two dedicated highways for voice/data and one for high speed signal/control. The signal/control highway can be operated at the same or one-half the speed of the voice/data highways. This is software programmable.

The above configurations allows the system to be placed on twisted pair or coax as well as via fiber cable (multimode or single mode). It is more efficient via fiber cable due to the bandwidth requirements, attenuation factors, and electrical interference problems.

This system can also be used over twisted pair by using two pair and two line repeaters per highway.

Due to the many locations which are time-division multiplexed on the same fiber in the same direction, synchronization in this system is extremely important. The synchronization used according to this system will be discussed herein.

The object of the network synchronization is to provide a synchronization between the clock at the voice data central office equipment 104 (primary) and that at the voice data premise equipment 108 (secondary). Once this synchronization is established, then, the system can operate correctly as long as synchronization is not later lost. Therefore, the synchronization will be described herein with reference to start up of a particular location which we will call location X (for illustrative purposes).

Upon start up of location X, the secondary line controller 128 at location X will default to the default address, which, in the best mode of this invention, is address 255. Local microprocessor 140 at the voice/data premise equipment loads this default address 255.

Main microprocessor 237 is continually polling all remote locations, as discussed above. When main microprocessor polls default address 255, if one of the secondary line controllers is still defaulted to 255, the primary will detect a secondary in start-up mode. Accordingly, main microprocessor 237 will send the following to the secondary location, location X. First, a permanent subscriber address code between 1 and 254 will be sent. A coarse digital delay is determined based on the loop length and is also sent. A time slot assignment and a highway assignment will be sent to this location along with a send synch pattern instruction.

The secondary at location X places the permanent address code in its identification register and in the address byte of a local memory within memory 156. Further operations which occur will be discussed herein with reference to FIG. 14 which shows a first embodiment of the network synchronizer according to the present invention.

FIG. 14 shows the slave system which effects this delay. Secondary line controller 128 has internal phase shift registers 270 which can be programmed in half clock cycle intervals. The selector selects one of the outputs of these phase shift registers, and provides it as an output 274 thereof. The selector is controlled by microprocessor 140 based on the delay setting above.

When main microprocessor 237 initially sends information including the permanent address code, it also sends this coarse digital delay value as discussed above. This digital delay value causes microprocessor 140 to initially access selector 272 based thereupon. At this time, the secondary sends a confirmation to primary microprocessor 237 which includes confirmation of all information.

The synchronization occurs as follows. First, the local (remote) for location X sends the assigned synchronization order to the primary in the assigned time slot. The primary, using the network synchronizer seen in FIG. 15, checks the synchronization between this data and its own data. The first data transmission causes a coarse adjustment using identity comparator 287. The FIG. 15 network synchronizer reads a formatted word and finds a relation. Based on this relation, main microprocessor 237 sends the first coarse adjustment to the selector 272 of secondary line controller 128. This coarse adjustment sets the selector to be within a more or less coarse distance. The primary microprocessor 237 then sends a new setting to the secondary, and the secondary sends a message including information back to the primary, until the incoming synch pattern is within a 30° phase difference of the original synch pattern. Time slots themselves can also be offset, with one time slot equalling eight cycles. Since shift register 270 only includes seven clock cycles, anything more than seven clock cycles can offset the time slot in order to have a one time slot offset with the zero clock cycle shift.

The second adjustment is the fine adjustment. The primary microprocessor then assigns a time slot having 'idles' on both sides. That is, this time slot is between unused time slots. The network synchronizer 150 at the premise location includes a digital delay line which receives a delay instruction for microprocessor 140 via the primary.

Figure 15:
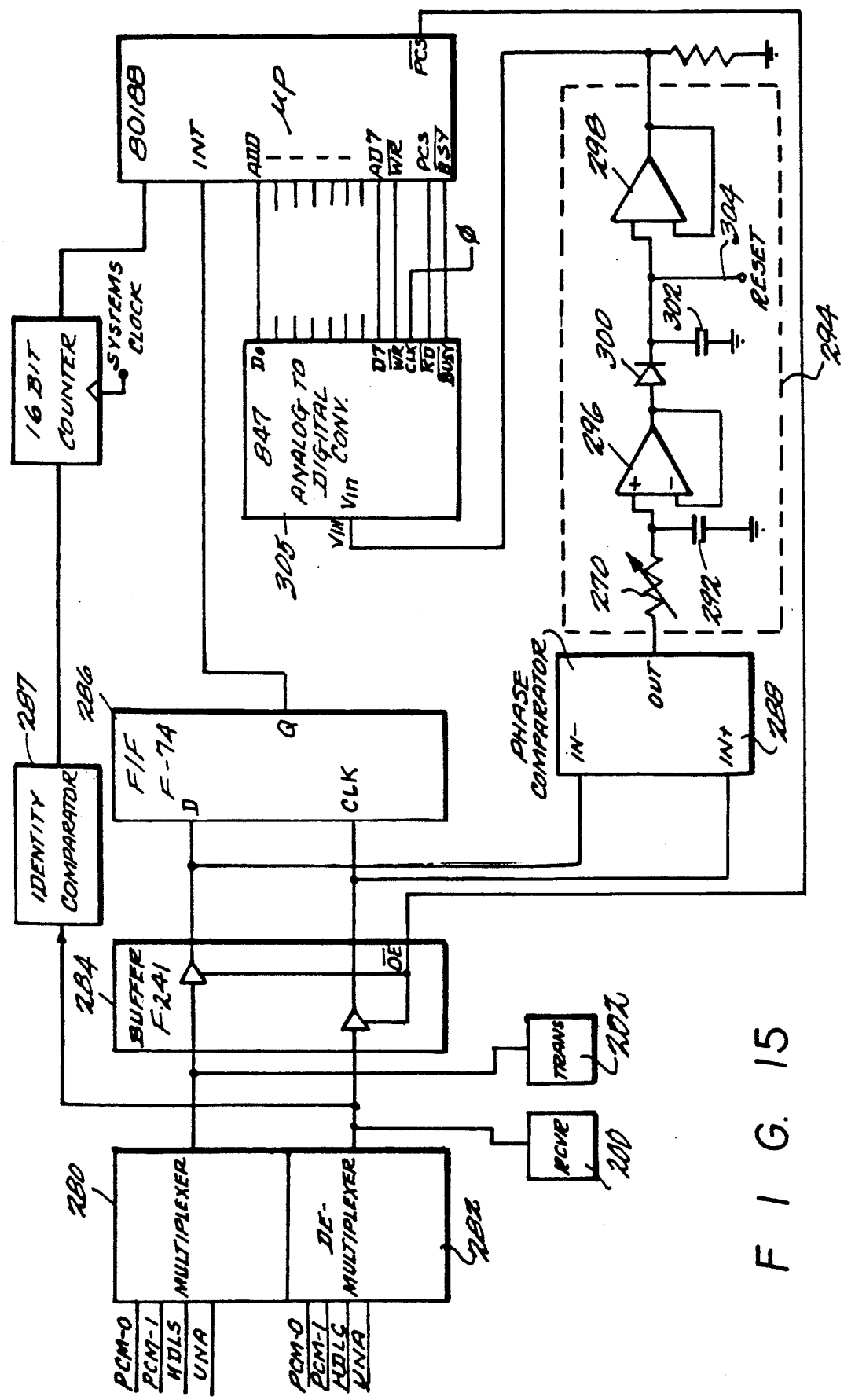
FIG. 15 shows a detailed layout of the synchronizer as used the central office location.

The master network synchronizer is shown in FIG. 15, and will now be discussed. Transmit and receive lines are shown in FIG. 15 as well as optical transmitter 202 and optical receiver 200. Multiplexer/demultiplexer 220 (a Siemens 2040) is shown as separate multiplexer 280 and demultiplexer 282. These signals are buffered by a TTL buffer 284 which can be embodied by a 74F241. The transmit and receive information are also connected to the inputs of a D flip flop. The transmit information is coupled to the D input of this flip flop with the receive information coupled to the clock input.

The synch word chosen to be used is typically of the form 011 ... 110. This synch word includes a string of ones surrounded by zeros. This causes the D flip flop 286 to assume one state when the transmit information comes first, and assume another state when the receive information comes first. This word allows the system to determine a direction of bias from absolute synch of the network. The receive and transmit information are also coupled to a phase comparator 288 which compares the phase between these two information and produces an output signal indicative of the phase difference. This output signal is smoothed by an RC network including resistor 290 and capacitor 292 and coupled to a threshold/peak detector 294.

The threshold/peak detector includes two operational amplifiers or OP amps, 296 and 298. One OP amp 296 is coupled to the output of the RC network. OP amp 296 is connected as a follower, and has its output connected to diode 300 and capacitor 302, therefore forming a peak detector circuit coupled to the input of OP amp 298 also configured as a follower. Reset line 304 can be driven low in order to reset this peak detector.

The output of the peak detector 296 is coupled to an A to D converter 305 which provides the microprocessor 237 with information on the amount of the phase difference. By using multiple passes, microprocessor 237 can thus provide information on the amount of phase difference and adjust this phase difference using the above mentioned three phase difference compensating structures. These phase difference compensating structures are: (1) shifting the time slots, (2) changing the number of shift registers in series with the signal, and (3) changing the setting of the digital delay 150 at the subscriber location.

Figure 16:
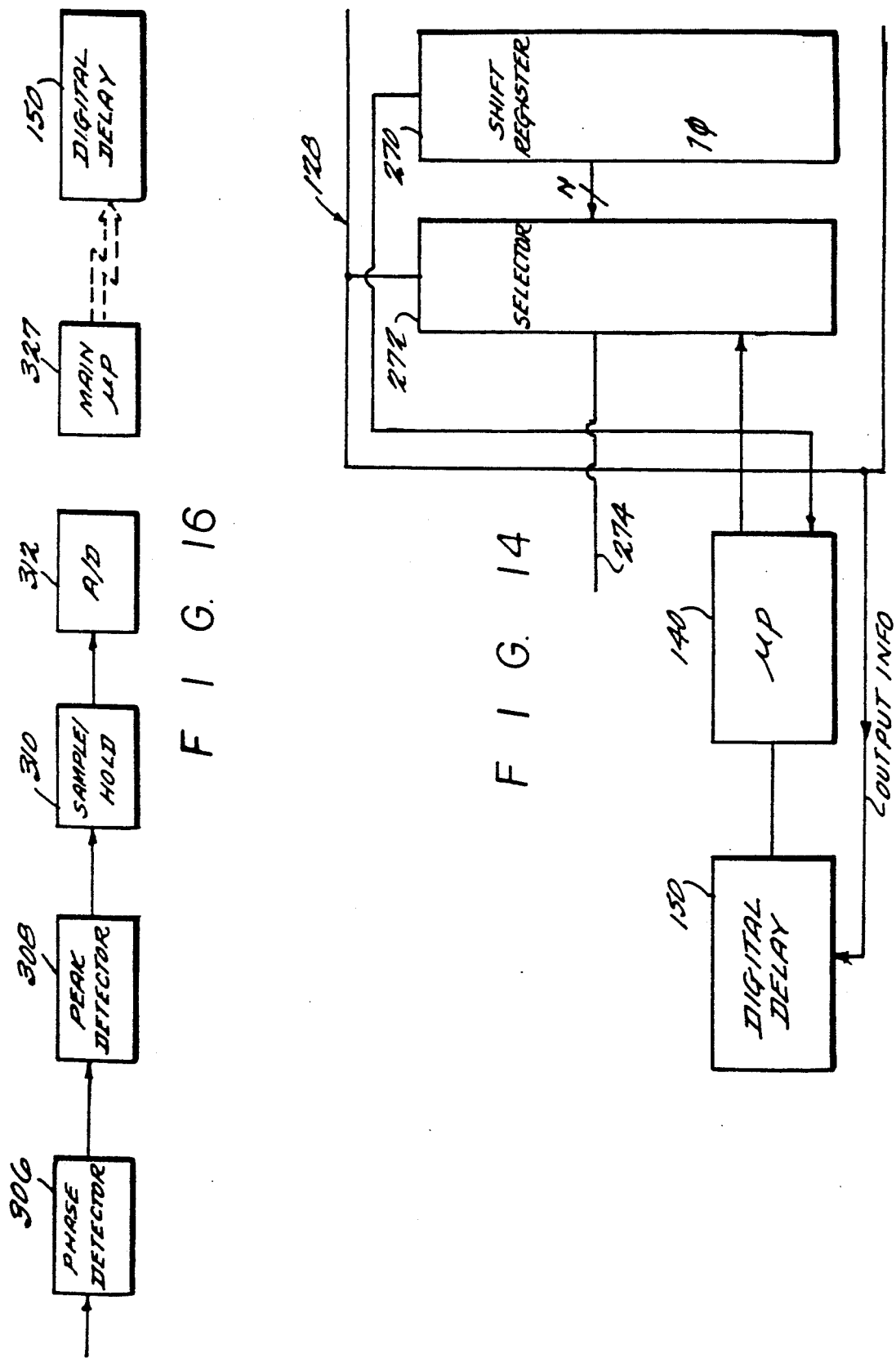
FIG. 16 shows a second embodiment of the network synchronizer.

A second embodiment of the network synchronizer of the central office location is shown in FIG. 16. According to this structure, phase detector 306 is connected to a peak detector 308 which is connected to sample and hold 310 which is connected to an A to D converter 312. This A to D converter 312 instructs main microprocessor 237 of a difference, and this difference is sent to a programmable digital delay line 150 at the subscriber location. The problem with this second embodiment is that it shows only timing differences and does not determine fast or slow. Accordingly, the utility of this structure is limited.

In this way, the information is effectively synchronized.

The operation of the systems discussed above is often handled by software. A number of flowcharts set forth in FIGS. 17-19 will now be discussed in detail.

Figure 17:
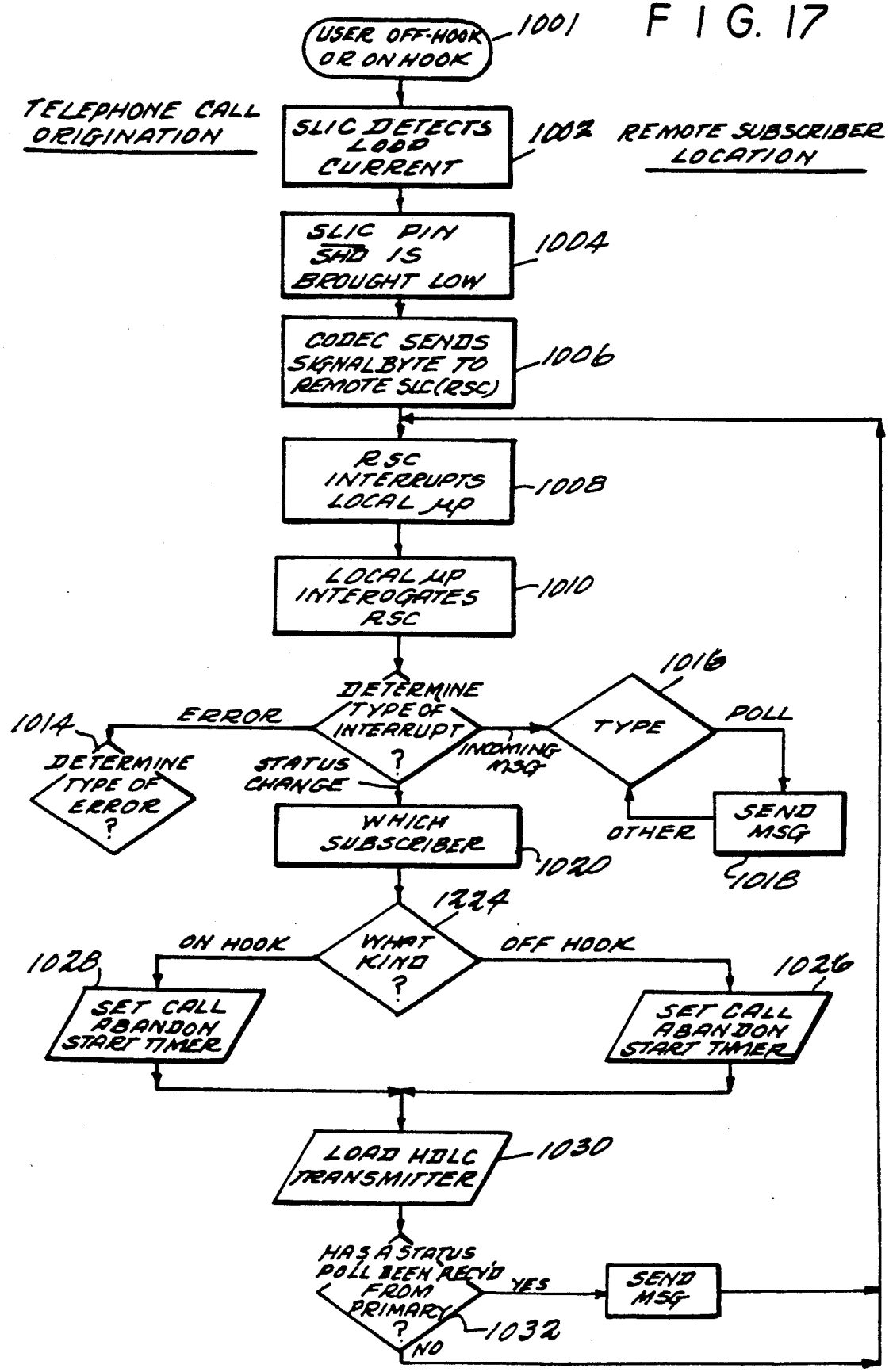
FIG. 17 shows the steps executed for a telephone call origination.

FIG. 17 shows the steps executed for a telephone call origination. These steps begin when one user picks his telephone off the receiver. This initiating user will be called user A, and user A is shown going off-hook at step 1001. This off-hook initiates the process shown in FIG. 17. At step 1002 in FIG. 17, the secondary line interface card, or SLIC 120, detects the loop current corresponding to an off-hook, and correspondingly the SLIC pin SHD is brought low to indicate this off-hook condition. The SHD pin is coupled to codec 124 which detects this condition and, as a result sends a signal back to the remote secondary line controller 128 (RSC). This signal byte is sent at step 1006. The output of the codec is a highway which has 8-64K bit channels, 4 of these 64K channels in each direction. This highway can carry much data information, including the status information indicative of the off-hook condition.

At step 1008 the RSC interrupts the local microprocessor (RSC interrupt). This interrupt is used for errors, messages and changes in status. Therefore, as a result of this interrupt, the local microprocessor is informed that there is an error or change in status. At step 1010, in response to the RSC interrupt, the local microprocessor interrogates the RSC to determine what kind of interrupt exists. The type of interrupt is determined by the decision block at step 1012.

If the interrupt is indicative of an error, control passes to the left side of block 1012. At this time, the type of error, be it overflow, response, or CRC is detected at step 1014. The error is processed using standard methods at step 1015. If the type of interrupt is an incoming message to the RSC, step 1016 determines the type of message, either broadcast, status poll or command. If the type of message is status poll, the RSC sends the loaded message to the primary at step 1018.

After the type of interrupt is determined, the subscriber which initiated the interrupt is determined in step 1020 using last-look logic.

At step 1024, the type of interrupt which has occurred is determined as being on-hook or off-hook. If the type of change is off-hook, a call originate it set at step 1026 and a timer is started. Similarly, if the status change is to on-hook, call abandon is set, and a timer is started. At step 1030, the HDLC transmitter is loaded with the information obtained above. This occurs by loading this information into a 16 byte status message in the SLC. This 16 byte status message includes the associated port and channel of the central office including the location address, port and channel that has gone off- or on-hook, and a message word indicative thereof. At step 1032, the system enters a loop to await a status poll from the primary.

Figure 18:
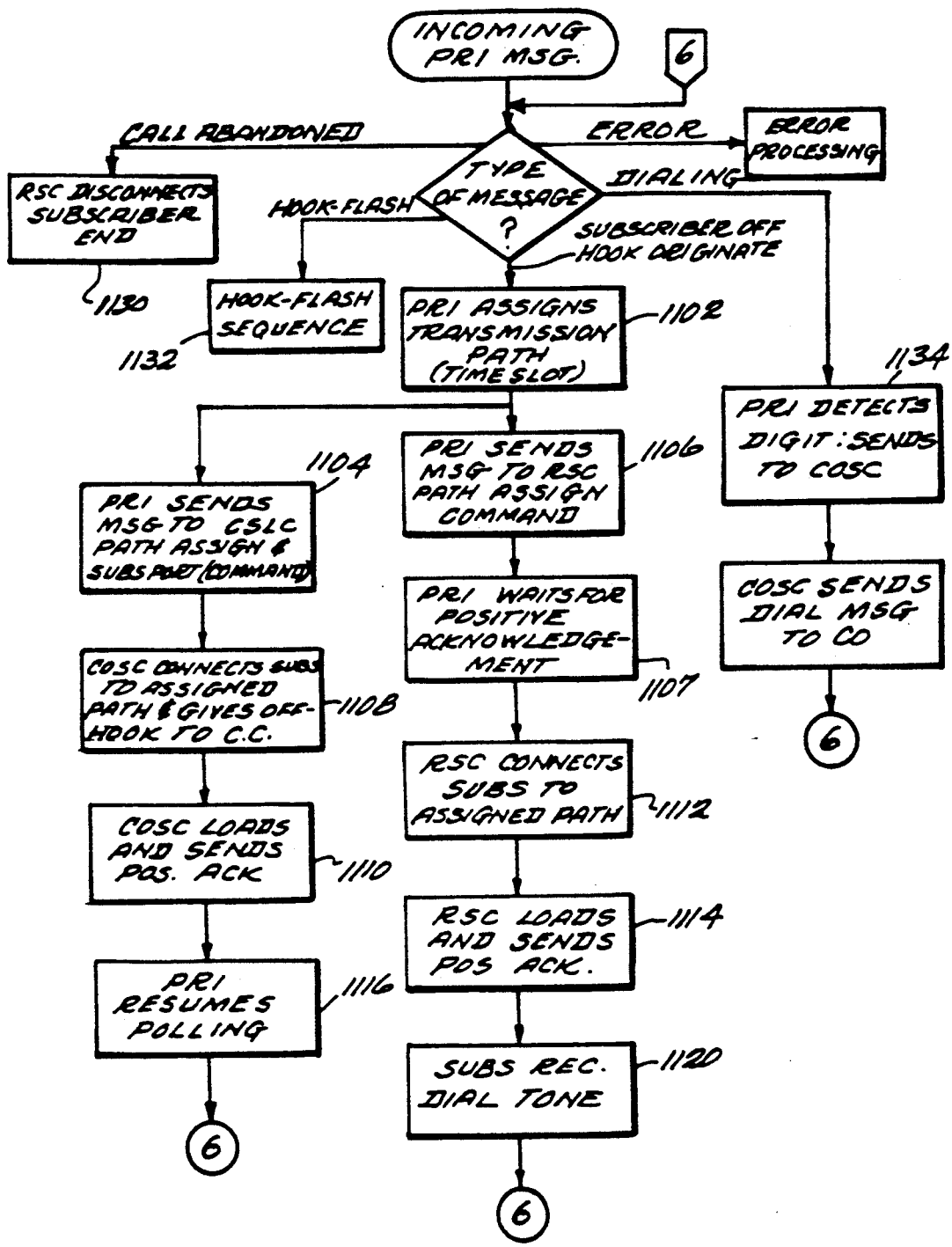
FIG. 18 shows an incoming message to the primary.

FIG. 18 shows the path of an incoming message to the primary. At step 1100, the type of message is determined—between call abandon, call originate, or dialing.

If the type of message indicates a call originate, the primary will then be required to assign a transmission path and time slot to the call. The primary maintains a memory map of all calls placed within the system, and will assign the next available time slot to this call. This routine is shown initiated at step 1102.

Steps 1104-1120 show respective steps taken by the central office and remote during this time sequence. The first step occurs at step 1104 when the primary sends a message to the COSC, or central office SLC. This message includes a path assignment command and the port to be used. The primary also sends a message to the remote RSC, including a path assignment command, at step 1106. At step 1108, the COSC connects the subscriber to the assigned path and sends an off-hook to the central office. The COSC then loads and sends a positive acknowledgment at step 1110. At the other end, the RSC connects the subscriber to the assigned path at step 1112. The RSC then also loads and sends a positive acknowledgment in step 1114. The primary then resumes polling at step 1116, while the subscriber recognizes a dial tone at step 1120.

In this way, both ends have been connected to the proper path, and the telephone conversation can ensue.

If the incoming primary message has been determined to be a call abandon, the RSC disconnects the subscriber end at step 1130, and then returns to processing. If the message is a hook flash, appropriate measures are taken as shown in the flow chart at step 1132 by a hook-flash sequence. Those of ordinary skill in the art would certainly understand many hook-flash sequences that could be used.

If the type of message is a dial sequence, the primary detects the dial digit and sends it to the COSC at step 1134. The COSC then sends a message to the central office processor indicative of this dial digit. Those of ordinary skill in the art understand many ways that dials, pulses and telephone tones can be detected and sent in this way.

Figure 19:
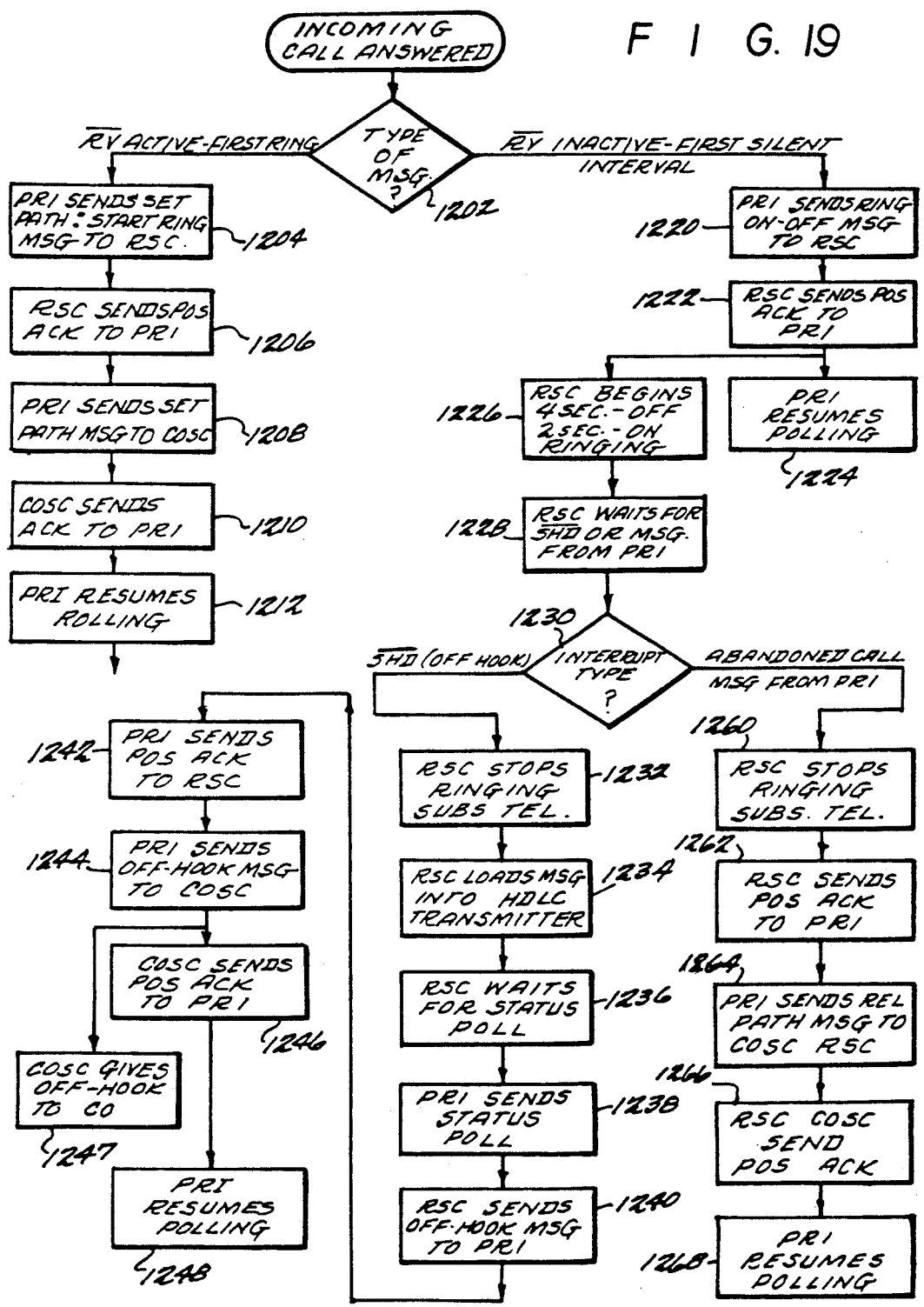
FIG. 19 shows the routine of an incoming call being answered.

The routine for an incoming call being answered is shown in FIG. 19. This routine is novel in that the remote secondary line controller (or RSC) performs the ring timing to produce the ring intervals, and does so in a novel way.

The type of message is first determined at step 1202. The two states which are detected are first ring and first silent interval. The first ring is the signal which is detected the first time an incoming ring pulse occurs. A problem with this detection in the prior art has been that sometimes only a partial ringing pulse is detected. If the first ring is detected, at step 1204 the primary sends the set path and start ring message to the RSC. The RSC acknowledges this at step 1206, and in response the primary sends a set path message to the COSC at step 1208. The COSC acknowledges at 1210 and the primary then resumes polling at step 1212. This initiates the incoming call cycle. At the end of the first ring period, the first silent interval is detected, and control passes from step 1202 to step 1220. The primary first sends the ring cut-off message to the RSC at step 1220, which the RSC acknowledges at step 1222. The primary then resumes polling as shown in step 1224, while the RSC begins a timer at step 1226. This timer is a 4 second off, 2 second on ringing timer. This timing is maintained until a message from the primary (for example, call abandon) or an off-hook from the associated telephone is received. This is shown at step 1228. Once one of these messages is received, an interrupt is detected at step 1230. If this interrupt is an SHD-type interrupt, control shifts to the left in step 1230 beginning with the RSC stopping the subscriber telephone ringing at step 1232. The RSC then loads the message into the HDLC transmitter at step 1234 and waits for a status poll at step 1236. In response to a primary status poll at step 1238, the RSC sends an off-hook message to the primary at step 1240. The primary acknowledges this message at step 1242 and sends an off-hook message to the COSC at step 1244. In response to this message, the COSC provides an off-hook to the central office at step 1247 and sends a positive acknowledgment at step 1246. The primary then resumes polling as shown at step 1248.

To abandon a call, the RSC will flow to the right after the decision block of step 1230. At step 1260, the RSC will stop ringing the subscriber telephone, and the RSC will send a positive acknowledgment to the primary of step 1262. The primary will then send a release path message to the central office RSC at step 1264. This is acknowledged at step 1266, and the primary will resume polling at step 1268. Using this sequence, the call has been abandoned.

A similar operation occurs to abandon a telephone call, by detecting an on-hook and sending similar messages between the primary and secondary. Those of ordinary skill in the art could certainly understand how this was done using similar techniques to those shown in FIGS. 17-19. Similarly, this method of polling the remote location can be used to poll a meter that is at the remote location to detect a hook flash, error detection and other such operations. A broadcast mode is also provided in which new data, such as a new software update, is sent via the telephone line to all the different RSCs. Also, a meter poll function in which a meter, at the subscriber premise is read, can be incorporated into these functions.

Although only a few exemplary embodiments of this invention have been described in detail above, those skilled in the art will readily appreciate that many modifications are possible on the exemplary embodiments without materially departing from the novel teachings and advantages of this invention.

Accordingly, all such modifications are intended to be included within the scope of this invention as defined in the following claims.

What is claimed is:

1. A telephone network, comprising:
   a primary controller;
   a plurality of secondary controllers, each coupled to at least one telephone user; and
   a plurality of means for synchronizing each of said secondary controllers with said primary controllers;
   said primary controller including:
   means for maintaining a map of telephone conversations in progress;
   means for assigning a new time slot to a new telephone conversation with a first secondary controller, and sending a communication to said new time slot to said first secondary controller;
   means for polling each said secondary controller to determine a status change; and
   means for maintaining a communication channel with said first secondary controller during said new time slot;
   said secondary controller including:
   means for recognizing a status change;
   means for responding to a poll from said primary controller by communicating said status change; and
   means for receiving said communication indicating said new time slot from said primary controller and maintaining said communication channel to said primary controller during said new time slot.

2. A telephone network, comprising:
   a primary controller including means for determining one among a plurality of secondary controllers to which a communication initiation is directed and sending an output message thereto indicative of said communication initiation; and
   a plurality of secondary controllers, each coupled to said primary controller and to at least one user telephone set, for:
   1) receiving said output message;
   2) beginning a timer upon receipt of said output message, and
   3) sending a ringing tone to said user telephone set based on said timer.

3. A network as in claim 2 wherein the timer is started by detection of a first silent interval in said output message.

4. A network as in claim 3 wherein said timer is a four second off, two second on ringing timer.

5. A telephone network, comprising:
   a plurality of interfaces to a subscriber telephone;
   a plurality of means for detecting an off-hook condition of subscriber telephones connected to said plurality of interfaces;
   a plurality of local controller means, each coupled to said plurality of detecting means for:
   1) detecting a change in said off-hook condition;
   2) detecting which subscriber caused said change; and
   3) assembling a message based on said change and an address indicative of said subscriber causing said change and transmitting said message; and
   main assigning controlling means, coupled to said local controller means for determining a time slot of operation to be used for further communication after said change.

6. A network as in claim 5 further comprising a plurality of controller means coupled to a plurality of means for detecting an off-hook condition, said main assigning controlling means coupled to said plurality of local controller means.

7. A network as in claim 5 wherein said main assigning controlling means is a microprocessor which continually circular polls said local controller means.

8. A network as in claim 7 further comprising a control bus, wherein said local controller means and said microprocessor of said main assigning controlling means are coupled together by said control bus.

9. A network as in claim 7 wherein said main assigning controller means includes means for providing an off-hook detection to a central office in response to a detection of an off-hook from said subscriber telephone.

10. A network as in claim 8 wherein said local controller means and said main assigning controller means operate in a time division fashion, and wherein said time slot determined by said main assigning controlling means is a time slot in which both structures operate.

11. A network as in claim 8 wherein said local controller means includes means for detecting an incoming call, and means responsive to said incoming call detecting means for starting a ring timer.

12. A network as in claim 11 wherein said ring timer is coupled to said subscriber telephone, and produces a ringing current to said subscriber telephone at predetermined intervals.

13. A network as in claim 12 wherein said ring timer is started after a first silent interval.

14. A telephone system, comprising:
a central office controller for determining when any of a plurality of remote locations should produce a ring tone to an associated subscriber telephone and producing an output to each remote location that should produce said ring tone; and
a remote unit, connected to said central office controller, and located at said remote location, including:
a ring generator for producing a continuous AC voltage at a ringing frequency;
means, coupled to said ring generator, for detecting zero crossings of said AC voltage and producing zero cross output signals, indicative thereof;
means for receiving said output from said central office controller;
logic means for detecting when said output from said central office controller and said zero cross output are simultaneously present and producing a logic output indicative thereof; and
means for coupling said continuous AC voltage to said ring generator only when said logic output is present.

15. A system as in claim 14 wherein said output produced by said central office controller is produced during a certain time interval.

16. A system as in claim 14 wherein said receiving means includes timer means for producing a timer on-/off signal having a predetermined duty cycle when said output from said central office controller is received.

17. A system as in claim 16 wherein said coupling means is a relay, and said logic means produces a switching voltage for said relay only when both of said zero cross output, and said output from said central office controller, are simultaneously present.

18. A remote ringing system for a telephone which is adapted to be connected to a central office that produces a ring command, comprising:
ring generator means for producing a continuous AC voltage at a ringing frequency;
means, coupled to said ring generator means, for detecting zero crossings of said AC voltage and producing a zero cross output indicative thereof;
timer means for producing an on and off timing signal at a predetermined duty cycle for said ringing when said ring command is present;
logic means, coupled to said timer means and to said zero crossing means, for producing an output only when both said zero crossing signal is simultaneously present with said on timing signal from said timer means; and
relay means, coupled to receive said AC voltage at a load input terminal, and to receive said output of said logic means at a control terminal, and coupled at an output thereof to a ringer circuit for coupling said AC voltage to said ringer circuit only when said logic signal is produced.

* * * * *